(12) United States Patent
Baillargeon et al.

(10) Patent No.: US 9,979,164 B2
(45) Date of Patent: May 22, 2018

(54) ELECTRICAL DISTRIBUTION APPARATUS, SYSTEM, AND METHODS OF ASSEMBLING SAME

(71) Applicant: General Electric Company, Schenectady, NY (US)

(72) Inventors: Jeremy Robert Baillargeon, Southington, CT (US); Michael Richard Wood, Southington, CT (US); Mariusz Duda, Berlin, CT (US); Jason William Newby, Wallingford, CT (US); Matthew Hock, Rocky Hill, CT (US); Gregory Mathias Probert, Plantsville, CT (US); John Matthew Hutson, Plainville, CT (US); Seth David Kravetz, Vernon, CT (US); Dennis James Rehmer, Bristol, CT (US)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 14/986,135

(22) Filed: Dec. 31, 2015

(65) Prior Publication Data
US 2016/0233650 A1    Aug. 11, 2016

Related U.S. Application Data

(60) Provisional application No. 62/113,643, filed on Feb. 9, 2015, provisional application No. 62/172,614, filed on Jun. 8, 2015.

(51) Int. Cl.
*H02B 1/20* (2006.01)
*H02B 3/00* (2006.01)
(Continued)

(52) U.S. Cl.
CPC ............. *H02B 1/20* (2013.01); *H01R 25/145* (2013.01); *H02B 1/056* (2013.01); *H02B 3/00* (2013.01); *H02B 1/21* (2013.01)

(58) Field of Classification Search
CPC . H02B 1/20–1/21; H02G 5/005; H01R 25/14; H01R 25/162
See application file for complete search history.

(56) References Cited

U.S. PATENT DOCUMENTS 3,219,887 A * 11/1965 Gerg ..................... H02B 1/21
                                                              174/99 B
3,277,425 A    10/1966 Marshall et al.
(Continued)

FOREIGN PATENT DOCUMENTS

DE    202013103444 U1    11/2014
JP    2005135833 A        5/2005
(Continued)

OTHER PUBLICATIONS

European Search Report and Written Opinion issued in connection with related EP Application No. 16154870.6 dated Sep. 6, 2016.
(Continued)

*Primary Examiner* — Robert J Hoffberg
(74) *Attorney, Agent, or Firm* — General Electric Company

(57) ABSTRACT

An electrical distribution apparatus is provided. The electrical distribution apparatus includes a stacked bus bar assembly including a plurality of bus bars. Each bus bar includes a first plate, a second plate spaced from the first plate in a first direction, and an intermediate member disposed between and interconnecting the first plate and the second plate. At least one of the first plate and said second plate is constructed of an electrically conductive material.

23 Claims, 31 Drawing Sheets

(51) Int. Cl.
  *H01R 25/14*   (2006.01)
  *H02B 1/056*   (2006.01)
  *H02B 1/21*    (2006.01)

(56) References Cited

U.S. PATENT DOCUMENTS

| | | | |
|---|---|---|---|
| 3,346,777 A * | 10/1967 | Leonard | H02B 1/056 361/636 |
| 3,354,357 A * | 11/1967 | Stanback | H02B 1/056 174/99 B |
| RE26,737 E * | 12/1969 | Jorgensen et al. | H02B 1/056 174/99 R |
| 3,484,538 A | 12/1969 | Nicholls | |
| 3,588,619 A * | 6/1971 | Layton | H02B 1/056 200/50.2 |
| 3,619,727 A * | 11/1971 | Hackenbroch | H02B 1/056 361/650 |
| 3,711,748 A * | 1/1973 | Dietz | H02B 1/056 335/35 |
| 3,787,712 A * | 1/1974 | Diersing | H02B 1/21 174/71 B |
| 3,787,713 A * | 1/1974 | Diersing | H02B 1/21 361/639 |
| 3,842,322 A * | 10/1974 | Leonard | H02B 1/056 361/673 |
| 3,924,921 A | 12/1975 | Feightner | |
| 4,008,365 A | 2/1977 | Carlson | |
| 4,038,505 A | 7/1977 | Gasparaitis et al. | |
| 4,157,582 A | 6/1979 | Myers | |
| 4,222,627 A * | 9/1980 | Cox | H01H 85/547 361/630 |
| 4,662,706 A | 5/1987 | Foley | |
| 4,744,003 A * | 5/1988 | Koslosky | H02B 1/056 200/50.07 |
| 4,870,542 A * | 9/1989 | Koslosky | H02B 1/056 361/640 |
| 4,945,450 A * | 7/1990 | Sabatella | H02B 1/42 361/609 |
| 5,067,043 A * | 11/1991 | Markowski | H02B 1/06 361/611 |
| 5,113,312 A * | 5/1992 | Pratt | H02B 1/14 361/611 |
| 5,126,918 A * | 6/1992 | Morby | H02B 1/056 361/644 |
| 5,166,861 A * | 11/1992 | Krom | H02B 1/056 174/16.2 |
| 5,172,300 A * | 12/1992 | Morby | H02B 1/21 361/609 |
| 5,894,405 A | 4/1999 | Fleege et al. | |
| 6,111,745 A | 8/2000 | Wilkie, II et al. | |
| 6,205,019 B1 * | 3/2001 | Krom | H02B 1/20 174/16.2 |
| 6,319,075 B1 * | 11/2001 | Clark | H01R 13/11 439/65 |
| 6,394,818 B1 * | 5/2002 | Smalley, Jr. | H01R 12/727 439/181 |
| 6,444,931 B1 | 9/2002 | Bartek et al. | |
| 6,848,953 B2 * | 2/2005 | Schell | H01R 13/055 439/825 |
| 7,008,272 B2 | 3/2006 | Blossfeld | |
| 7,059,892 B1 | 6/2006 | Trout | |
| 7,137,847 B2 | 11/2006 | Trout et al. | |
| 7,309,242 B2 * | 12/2007 | Clark | H01R 13/11 439/65 |
| 7,314,377 B2 * | 1/2008 | Northey | H01R 12/777 439/79 |
| 7,641,523 B2 * | 1/2010 | Chen | H01R 12/727 439/65 |
| 7,819,681 B1 * | 10/2010 | Rodrigues | H02G 5/007 174/88 B |
| 7,862,356 B1 * | 1/2011 | O'Leary | H02G 5/08 174/68.2 |
| 8,033,850 B2 * | 10/2011 | O'Leary | H02G 5/007 174/16.2 |
| 8,226,428 B2 | 7/2012 | Arnaud et al. | |
| 8,305,739 B2 | 11/2012 | Dozier | |
| 8,378,219 B2 * | 2/2013 | Lesieur | H02G 5/007 174/129 B |
| 8,456,807 B2 | 6/2013 | Tallam et al. | |
| 8,619,411 B2 | 12/2013 | Rodrigues et al. | |
| 8,641,432 B2 | 2/2014 | Northey | |
| 8,730,653 B2 * | 5/2014 | Robinson | H02B 1/20 361/637 |
| 8,764,495 B2 | 7/2014 | Ahangar et al. | |
| 8,873,223 B2 | 10/2014 | Rahn et al. | |
| 8,926,351 B2 * | 1/2015 | O'Leary | H01R 25/162 174/68.2 |
| 9,117,614 B2 | 8/2015 | Rahn et al. | |
| 9,121,593 B2 * | 9/2015 | Hayashi | H05B 33/0803 |
| 9,343,834 B2 * | 5/2016 | Tokuhara | H01R 13/04 |
| 9,472,369 B2 | 10/2016 | Dozier et al. | |
| 2005/0006053 A1 * | 1/2005 | Apfelbacher | H02B 1/052 165/80.2 |
| 2010/0020475 A1 | 1/2010 | Spitaels et al. | |
| 2010/0290174 A1 | 11/2010 | Harrison | |
| 2012/0092811 A1 | 4/2012 | Chapel et al. | |
| 2012/0094512 A1 | 4/2012 | Northey | |
| 2012/0218686 A1 * | 8/2012 | Robinson | H02B 1/20 361/637 |
| 2013/0327570 A1 * | 12/2013 | Bhathija | H01R 25/162 174/88 R |
| 2014/0211345 A1 | 7/2014 | Thompson et al. | |
| 2015/0056833 A1 | 2/2015 | Brungard et al. | |
| 2016/0164235 A1 | 6/2016 | Aporius et al. | |
| 2016/0233649 A1 * | 8/2016 | Baillargeon | H01R 25/162 |
| 2016/0233650 A1 | 8/2016 | Baillargeon et al. | |

FOREIGN PATENT DOCUMENTS

| | | |
|---|---|---|
| JP | 2008306924 A | 12/2008 |
| KR | 101370036 B1 | 3/2014 |

OTHER PUBLICATIONS

European Search Report and Written Opinion issued in connection with corresponding EP Application No. 16154870.6 dated Sep. 6, 2016.

* cited by examiner

_US 9,979,164 B2_

ELECTRICAL DISTRIBUTION APPARATUS, SYSTEM, AND METHODS OF ASSEMBLING SAME

CROSS-REFERENCE TO RELATED APPLICATIONS

This application claims the benefit of U.S. Provisional Patent Application No. 62/113,643, filed on Feb. 9, 2015, and U.S. Provisional Patent Application No. 62/172,614, filed on Jun. 8, 2015, the disclosures of which are hereby incorporated by reference in their entirety.

BACKGROUND

The field of the disclosure relates generally to electrical distribution systems, and more particularly, to electrical distribution apparatus including a stacked bus bar assembly providing a common bus form factor and connector interface while enabling variation in the ampacity of the electrical distribution apparatus, and electrical devices for use therewith.

At least some known panelboards provide an electrical distribution apparatus for mounting a plurality of circuit breakers to control electrical distribution from a main to one or more branch circuits. At least some known panelboards include a wall-mounted enclosure supporting conductive bus bars and electrical switching devices, such as circuit breakers, electrically coupled to the bus bars.

At least some known panelboards are designed such that panelboards having different ampacities, bus lengths, and/or mounting orientations have different bus form factors and/or electrical connector interfaces. As a result, electrical devices suitable for use on one type of panelboard are generally not suitable for use with panelboards having a different ampacity, bus length, or mounting orientation.

Accordingly, a need exists for a more universal electrical distribution apparatus that provides a common bus form factor and connector interface, while enabling variation in the ampacity, size, and mounting orientation of the electrical distribution apparatus.

BRIEF DESCRIPTION

In one aspect, an electrical distribution apparatus is provided. The electrical distribution apparatus includes a stacked bus bar assembly comprising a plurality of bus bars. Each bus bar includes a first plate, a second plate spaced from the first plate in a first direction, and an intermediate member disposed between and interconnecting the first plate and the second plate. At least one of the first plate and said second plate is constructed of an electrically conductive material.

In another aspect, an electrical distribution system is provided. The electrical distribution system includes a frame, a stacked bus bar assembly coupled to the frame, and an electrical device electrically coupled to the bus bar assembly. The bus bar assembly includes a plurality of bus bars, where adjacent bus bars of the plurality of bus bars are spaced from one another in a first direction, and each bus bar of the plurality of bus bars defines a connector channel extending around a perimeter of each bus bar. The electrical device includes a plurality of connector clips, where adjacent connector clips of the plurality of connector clips are spaced from one another in the first direction, and each connector clip of the plurality of connector clips is disposed within a respective connector channel of the connector channels.

In yet another aspect, a method of assembling an electrical distribution system is provided. The method includes providing a plurality of first plates, a plurality of second plates, and a plurality of intermediate members, wherein at least one of the plurality of first plates and the plurality of second plates includes electrically-conductive plates. The method further includes assembling a plurality of bus bars, wherein for each bus bar of the plurality of bus bars, assembling the bus bar includes coupling one first plate of the plurality of first plates, one second plate of the plurality of second plates, and one intermediate member of the plurality of intermediate members together such that the second plate is spaced from the first plate in a first direction by the intermediate member and at least one of the first plate and the second plate is constructed of electrically conductive material. The method further includes coupling the plurality bus bars together to form a stacked bus bar assembly, wherein the plurality of bus bars are coupled together such that adjacent bus bars of the plurality of bus bars are spaced from one another in the first direction.

BRIEF DESCRIPTION OF THE DRAWINGS

FIG. 6 is an enlarged partial view of another embodiment of a bus bar assembly including a bus bar having a flared electrical connector lead-in.

Although specific features of various embodiments may be shown in some drawings and not in others, this is for convenience only. Any feature of any drawing may be referenced and/or claimed in combination with any feature of any other drawing.

DETAILED DESCRIPTION

Figure 1:
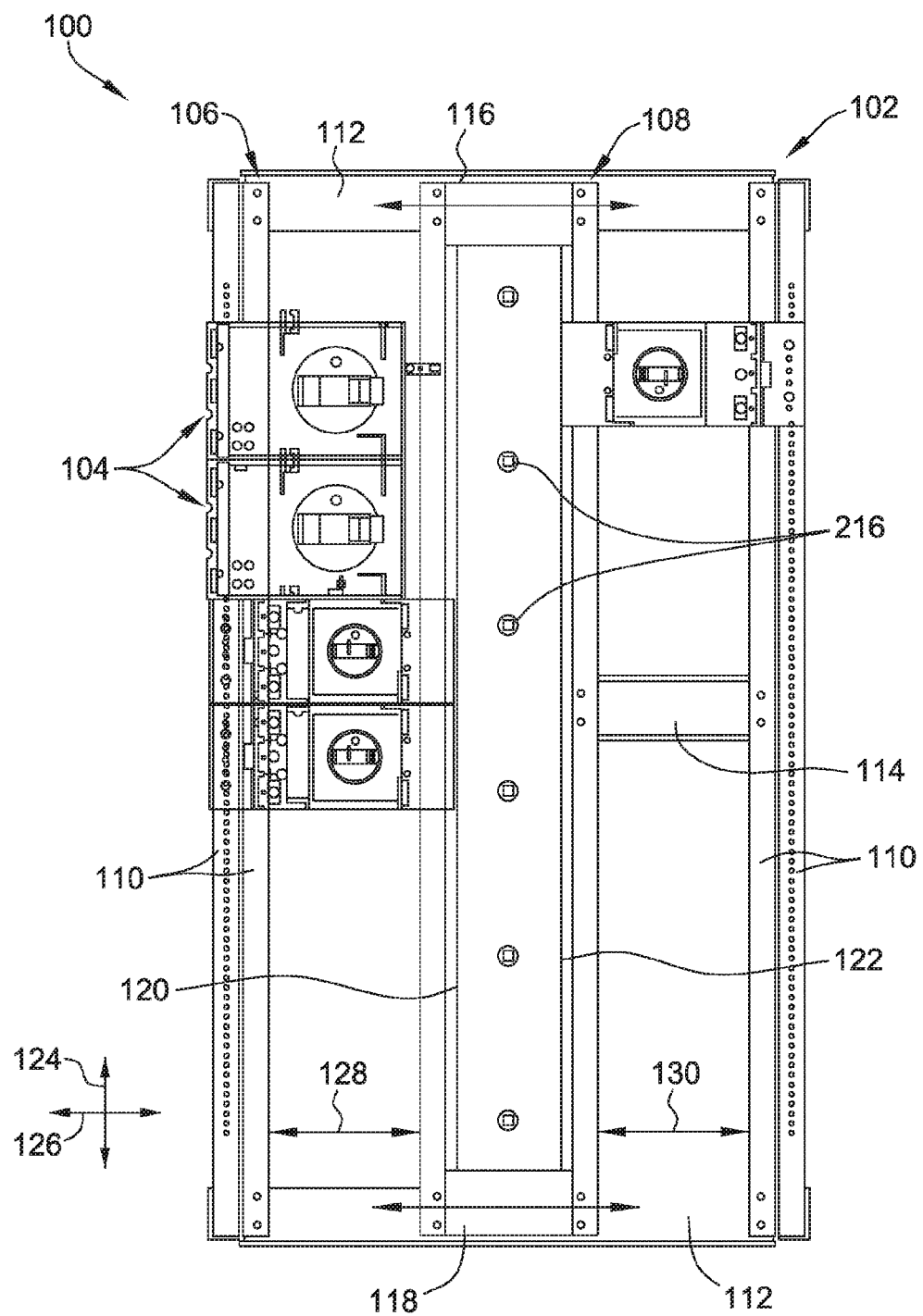
FIG. 1 is a plan view of an exemplary electrical distribution system including an electrical distribution apparatus, shown in the form of a panelboard that includes a stacked bus bar assembly.

FIG. 1 is a plan view of an exemplary electrical distribution system 100 including an electrical distribution apparatus 102, shown in the form of a panelboard, and a plurality of electrical devices 104 coupled to electrical distribution apparatus 102. Electrical distribution system 100 is configured to be electrically coupled to a main power circuit, such as a three-phase power supply, and to distribute power to one or more branch circuits electrically coupled to electrical distribution system 100 through electrical devices 104. Electrical devices 104 may include, but are not limited to, circuit breakers, circuit switching devices, electrical meters, and circuit interrupters other than circuit breakers, such as contactors, motor starters, motor controllers and other load controllers. Electrical devices 104 may also include adapters and interface modules, such as those described herein with reference to FIGS. 11 and 30-32.

As shown in FIG. 1, electrical distribution apparatus 102 includes a frame 106 and a stacked bus bar assembly 108 coupled to frame 106.

Frame 106 includes a plurality of support members to which components of electrical distribution system 100 are mounted. In the exemplary embodiment, frame 106 includes side rails 110, end rails 112 and cross-supports 114. Side rails 110 and end rails 112 collectively define a perimeter of frame 106. Each side rail 110 extends parallel to a longitudinal axis of frame 106, and is oriented substantially parallel to the other side rail 110. Each end rail 112 is oriented substantially orthogonal to side rails 110, and substantially parallel to the other end rail 112. Each side rail 110 is coupled to one of end rails 112 at a first end of side rail 110, and the other end rail 112 at a second end of side rail 110. Cross-supports 114 are disposed between side rails 110 and end rails 112, and extend across a length or width of frame to provide additional support for components of electrical distribution system 100. In the illustrated embodiment, frame 106 includes one cross-support 114 coupled to each side rail 110 and oriented substantially orthogonal to side rails 110.

Bus bar assembly 108 includes a first end 116 coupled to one of end rails 112, a second end 118 coupled to the other of end rails 112, and a first side 120 and a second side 122 each extending from first end 116 to second end 118. First end 116, second end 118, first side 120, and second side 122 collectively define a perimeter of bus bar assembly 108. Bus bar assembly 108 extends a length along a longitudinal direction, indicated by arrow 124, from first end 116 to second end 118, and a width along a transverse direction, indicated by arrow 126, orthogonal to longitudinal direction 124. Bus bar assembly 108 may have any suitable length and width that enables electrical distribution apparatus 102 to function as described herein.

In the exemplary embodiment, bus bar assembly 108 is coupled to frame 106 at each end rail 112 and at cross-support 114. Bus bar assembly 108 is disposed between side rails 110, and is spaced from each side rail 110 by a lateral spacing 128, 130 sized to receive electrical devices 104. The size of each lateral spacing 128, 130 may be varied to accommodate electrical devices 104 having different sizes. For example, the sizes of lateral spacings 128, 130 may be adjusted by varying the location at which bus bar assembly 108 is coupled to end rails 112 and cross-support 114, or by varying the width of bus bar assembly 108.

Figure 2:
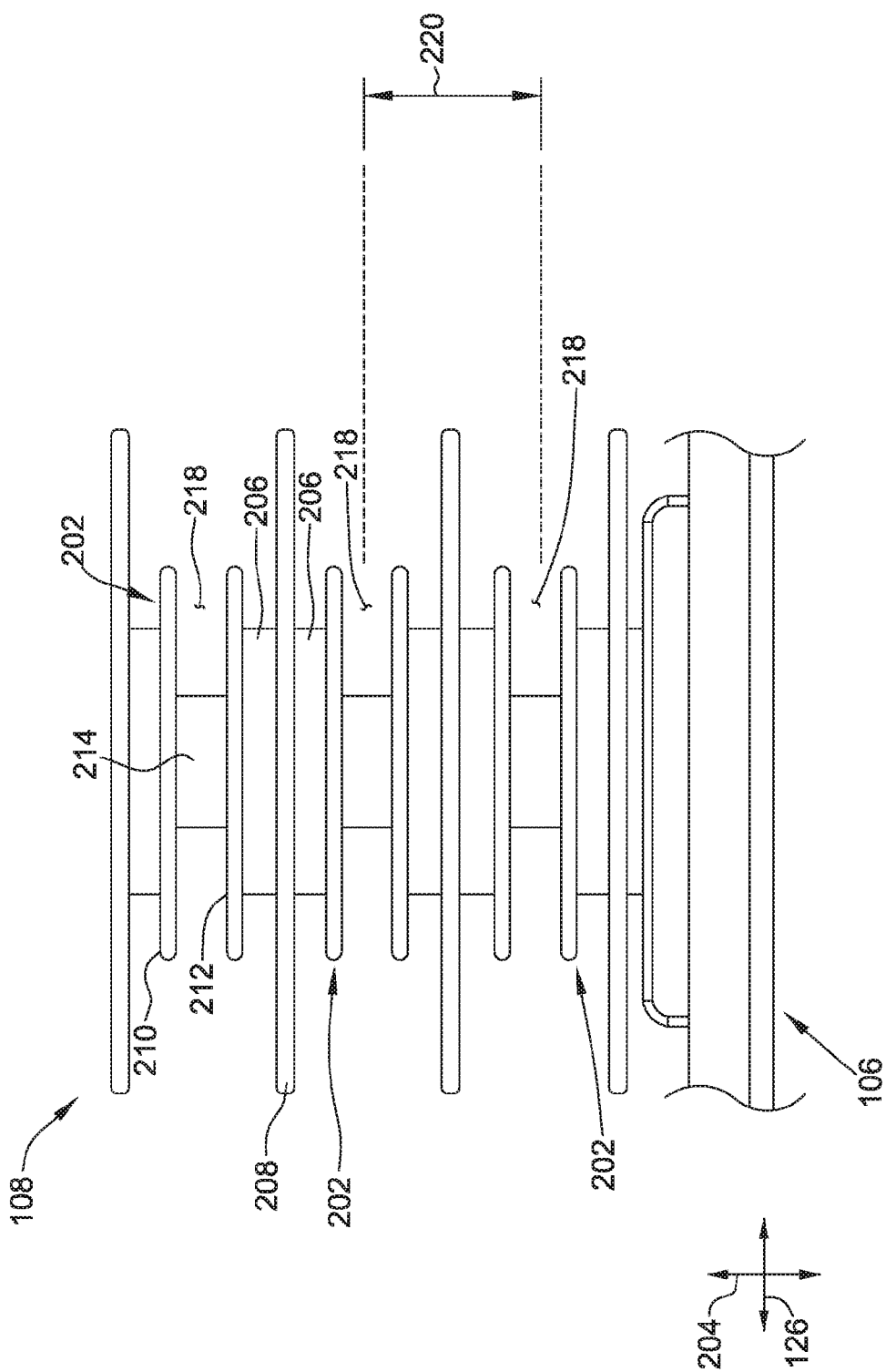
FIG. 2 is an end view of the bus bar assembly shown in FIG. 1.

FIG. 2 is an end view of bus bar assembly 108 shown in FIG. 1. As shown in FIG. 2, bus bar assembly 108 includes a plurality of modular bus bars 202 arranged in a stacked configuration. That is, bus bars 202 are aligned with one another in a vertical direction, indicated by arrow 204, orthogonal to both longitudinal direction 124 (FIG. 1) and transverse direction 126. Moreover, each bus bar 202 is spaced from each adjacent bus bar 202 in vertical direction 204. Each bus bar 202 is configured to be coupled to one phase of a multi-phase power supply. The exemplary embodiment includes three bus bars 202, and each bus bar 202 is configured to be coupled to one phase of a three-phase power supply.

Each bus bar 202 is spaced from adjacent bus bars 202 by one or more spacers 206 and/or bus bar insulators 208. Spacers 206 and bus bar insulators 208 provide physical and electrical isolation between each bus bar 202. In the exemplary embodiment, each bus bar 202 is spaced from adjacent bus bars 202 by one bus bar insulator 208 disposed between two spacers 206.

Spacers 206 and bus bar insulators 208 may be constructed from any suitable electrically insulative materials that enable electrical distribution apparatus 102 to function as described herein. In some embodiments, one or more of bus bar insulators 208 are constructed from an electrically insulative material having a relatively high thermal conductivity to facilitate dissipating or transferring heat generated by the bus bar assembly 108 during operation. Suitable electrically insulative materials that have a relatively high thermal conductivity include, for example and without limitation, fiber reinforced silicone rubbers, phenolic resins, fiber reinforced phenolic resins (e.g., reinforced with fiber-glass), thermosets, fiber reinforced thermosets (e.g., reinforced with fiberglass), and combinations thereof.

In the exemplary embodiment, each bus bar insulator 208 extends beyond the sides of each bus bar 202. As described in more detail below, the configuration of bus bar insulators 208 provides additional isolation between bus bars 202 during installation of electrical devices by engaging an insulative component on an electrical device before an electrical connector of the electrical device contacts one of bus bars 202.

As shown in FIG. 2, each modular bus bar 202 includes a first plate 210, a second plate 212 spaced from first plate 210 in vertical direction 204, and an intermediate member 214 disposed between and interconnecting first plate 210 and second plate 212.

Each of first plate 210 and second plate 212 are substantially planar, each having a length extending in longitudinal direction 124 (FIG. 1), a width extending in transverse direction 126 orthogonal to longitudinal direction, and a thickness extending in vertical direction 204, which is orthogonal to both longitudinal direction 124 and transverse direction 126. The length and width of each plate define a plane. First plate 210 and second plate 212 are oriented substantially parallel to one another, and are spaced from one another in a direction substantially orthogonal to the planes in which first plate 210 and second plate 212 are disposed.

At least one of first plate 210 and second plate 212 is constructed from an electrically conductive material including, for example and without limitation, copper, aluminum, and combinations thereof. In the exemplary embodiment, each of first plate 210 and second plate 212 is constructed from an electrically conductive material. In other embodiments, one of first plate 210 and second plate 212 may be constructed from an electrically insulative material.

Intermediate member 214 is coupled to each of first plate 210 and second plate 212, and is substantially aligned with a transverse or lateral center of each of first plate 210 and second plate 212. Intermediate member 214 may be constructed from electrically conductive materials or electrically insulative materials. In the exemplary embodiment, intermediate member 214 is constructed of an electrically conductive material.

In the illustrated embodiment, first plate 210, second plate 212, and intermediate member 214 are formed separately from one another, and are coupled to one another using suitable fasteners, such as bolts or screws. In other embodiments, two or more components of each bus bar 202 may be formed integrally or unitarily with one another. In one embodiment, for example, intermediate member 214 and one of first plate 210 and second plate 212 are formed integrally with one another by an extrusion molding process. In yet another embodiment, first plate 210, second plate 212, and intermediate member 214 are formed integrally with one another by an extrusion molding process. In yet other embodiments, one or both of first plate 210 and second plate 212 may be segmented. That is, first plate 210 and/or second plate 212 may be constructed from a plurality of segments. Such segments may be interchangeable with plate segments having a different thickness, a different thickness, and/or a different conductivity such that the ampacity of bus bar assembly 108 may be varied along the length of bus bar assembly 108.

Components of bus bar assembly (i.e., spacers 206, bus bar insulators 208, first plates 210, second plates 212, and intermediate members 214) may be coupled to frame 106 and coupled to one another using suitable fasteners 216 (FIG. 1), such as bolts or screws. The fasteners may be constructed from an electrically insulative material or be otherwise electrically insulated from bus bars 202 to maintain electrical isolation between each bus bar 202.

Each of first plate 210 and second plate 212 has a width that is greater than a width of intermediate member 214. Moreover, first plate 210 and second plate 212 extend beyond the ends of intermediate member 214. Each bus bar 202 thus has an I-shaped or H-shaped cross-section, as shown in FIG. 2.

Moreover, as shown in FIG. 2, first plate 210, second plate 212, and intermediate member 214 cooperatively define a connector channel 218 extending transversely inward from each side of bus bar 202. Connector channel 218 is configured (e.g., sized and shaped) to receive electrical connectors from one or more electrical devices 104 (e.g., circuit breakers) therein. In the exemplary embodiment, each connector channel 218 extends around the entire perimeter of intermediate member 214 and bus bar 202 to define a single, continuous connector channel 218. That is, connector channel 218 extends around each side of intermediate member 214 and bus bar 202. As a result, electrical devices can be electrically coupled to bus bar 202 along any side of the plurality of sides defining the perimeter of bus bar 202 and bus bar assembly 108. In other embodiments, one or more of bus bars 202 may have two or more connector channels separated from one another (e.g., by intermediate member 214).

Each connector channel 218 is spaced from a connector channel of an adjacent bus bar 202 by a center-to-center spacing 220 measured along vertical direction 204. In the exemplary embodiment, center-to-center spacing 220 of connector channels 218 of adjacent bus bars 202 is substantially the same for each pair of adjacent bus bars 202. In other embodiments, center-to-center spacing 220 between connector channels 218 of adjacent bus bars 202 may vary.

The configuration of bus bar assembly 108 enables the ampacity (i.e., current carrying capacity) of bus bar assembly 108 to be varied without changing the geometry, dimensions, or center-to-center spacing of connector channels 218. For example, bus bar assembly 108 can achieve multiple ampacity ranges by interchanging conductive components of modular bus bars 202 with non-conductive components and/or by interchanging non-conductive components with conductive components, while maintaining the geometry, dimensions, and center-to-center spacing of connector channels 218. Moreover, the ampacity of bus bar assembly 108 can be modified by interchanging components of modular bus bars 202 with components having different widths and/or thicknesses, while maintaining the geometry, dimensions, and center-to-center spacing of connector channels 218. For example, the thickness of spacers 206 and/or bus bar insulators 208 may be varied to accommodate first plates 210 and second plates 212 of varying thicknesses while maintaining a constant center-to-center spacing 220 between connector channels 218 of pairs of adjacent bus bars 202. Additionally, each of first plate 210 and second plate 212 may be interchangeable with a plate having at least one of a different thickness, a different length, and a different width without changing a thickness of connector channels 218 and a center-to-center spacing 220 between adjacent connector channels 218. Additionally, the ampacity of bus bar assembly 108 may be varied along the length of bus bar assembly 108 by interchanging one or more segments of first plate 210 and/or second plate 212. For example, at least one of first plate 210 and second plate 212 may comprise a plurality of segments, where at least one of the segments is interchangeable with a plate segment having at least one of a different width, a different thickness, and a different conductivity than the least one segment without changing a thickness of connector channels 218 and center-to-center spacing 220 between adjacent connector channels 218.

The construction of bus bar assembly 108 thereby facilitates standardizing the electrical connection interface of bus bar assembly 108, while enabling flexibility in the ampacity of electrical distribution apparatus 102. Moreover, the configuration of bus bar assembly 108 provides a common form factor, which provides flexibility in positioning the bus bar assembly 108 on frame 106, and in connecting electrical devices to electrical distribution apparatus 102. Further, the common form factor of bus bar assembly 108 makes bus bar assembly 108 easily scalable to increase ampacity or the length of bus bar assembly 108 (e.g., for additional connection space). Moreover, because bus bar assembly 108 is centrally located relative to electrical devices 104 coupled thereto, electrical devices having different sizes (e.g., widths) can be mounted directly across from one another on bus bar assembly 108, as shown in FIG. 1.

Figure 3:
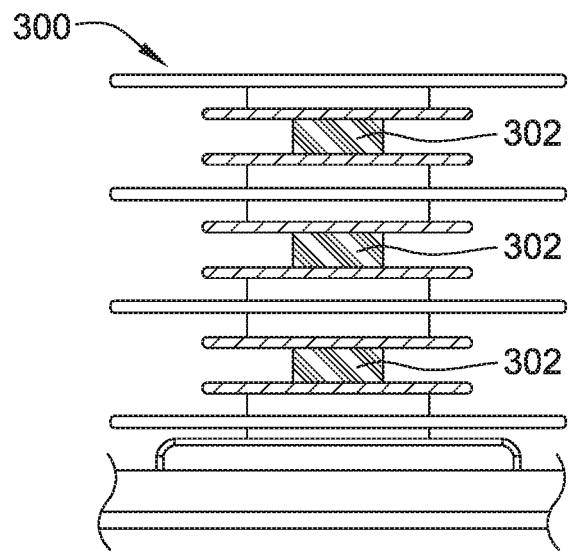
FIG. 3 is an end view of another bus bar assembly suitable for use with the electrical distribution apparatus shown in FIGS. 1 and 2 having a lower ampacity configuration than the bus bar assembly shown in FIG. 2.

FIG. 3 is an end view of another bus bar assembly 300 suitable for use with electrical distribution apparatus 102 having a lower ampacity configuration than bus bar assembly 108. Bus bar assembly 300 is substantially identical to bus bar assembly 108 shown in FIG. 2, except bus bar assembly 300 includes intermediate members 302 constructed of non-conductive materials.

Figure 4:
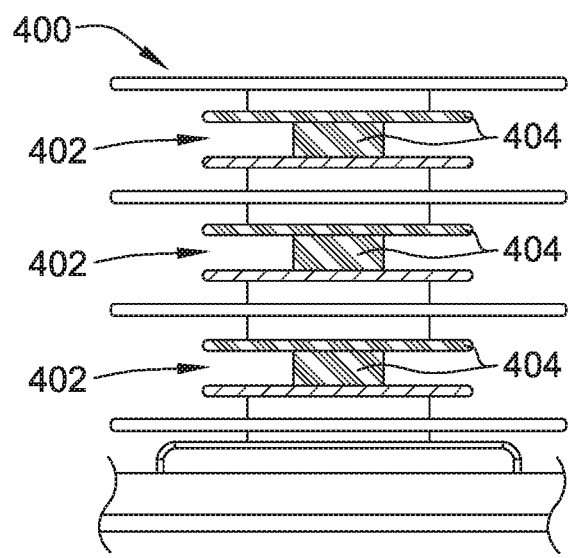
FIG. 4 is an end view of another bus bar assembly suitable for use with the electrical distribution apparatus shown in FIGS. 1 and 2 having a lower ampacity configuration than the bus bar assembly shown in FIG. 3.

FIG. 4 is an end view of another bus bar assembly 400 suitable for use with electrical distribution apparatus 102 having a lower ampacity configuration than bus bar assembly 300. Bus bar assembly 400 is substantially identical to bus bar assembly 300 shown in FIG. 3, except each bus bar 402 of bus bar assembly 400 includes one plate 404 constructed of non-conductive materials.

Figure 5:
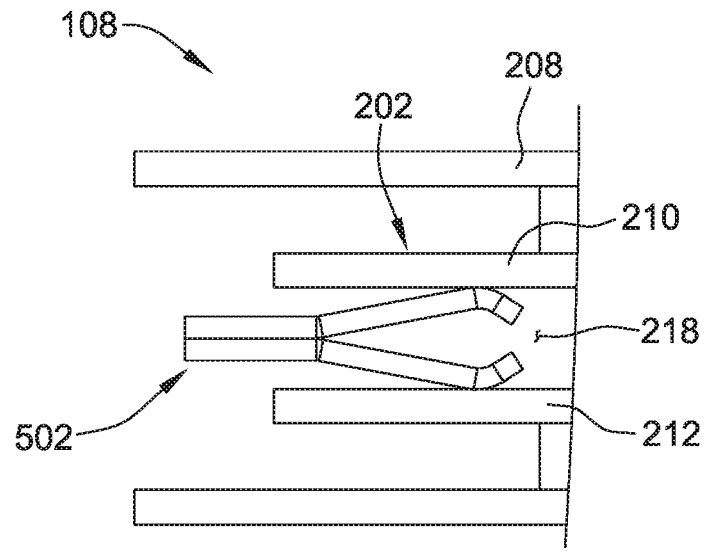
FIG. 5 is an enlarged partial view of the bus bar assembly shown in FIG. 2 connected to an electrical connector of an electrical device.

FIG. 5 is an enlarged partial view of bus bar assembly 108 of FIG. 2 connected to an electrical connector 502 of an electrical device, such as a circuit breaker. To connect an electrical device to bus bar assembly 108, electrical connector 502 is inserted into connector channel 218. Electrical connector 502 is configured to engage each of first plate 210 and second plate 212 to maintain an electrical connection between bus bar 202 and electrical connector 502. In the embodiment illustrated in FIG. 5, each end of first plate 210 and second plate 212 is straight, and is within the same plane as the remainder of the corresponding first plate 210 or second plate 212.

Figure 6:
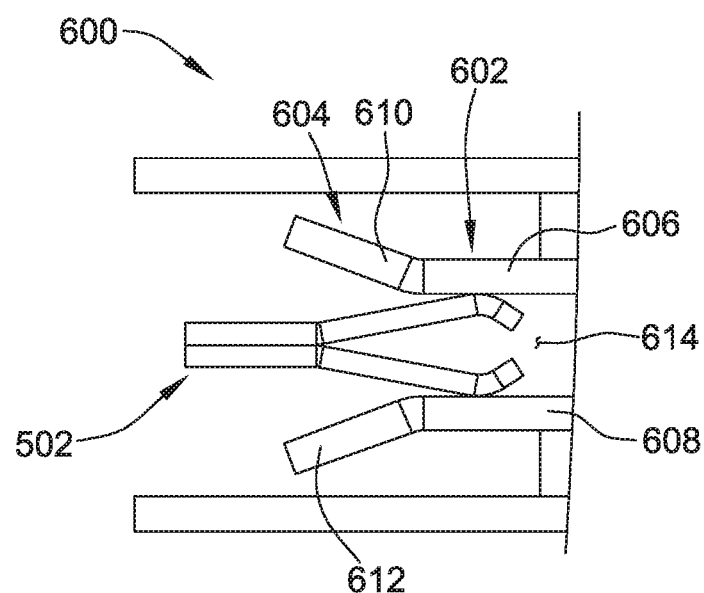

FIG. 6 is an enlarged partial view of another embodiment of a bus bar assembly 600 including a bus bar 602 having a flared electrical connector lead-in 604. Specifically, bus bar 602 includes a first plate 606 and a second plate 608 each having a respective flared end segment 610, 612 oriented at an oblique angle with respect to the plane in which the corresponding first plate 606 or second plate 608 is disposed. End segment 610 of first plate 606 extends from first plate 606 at an oblique angle in a direction away from second plate 608, and end segment 612 of second plate 608 extends from second plate 608 at an oblique angle in a direction away from first plate 606. Together, first plate 606 and second plate 608 partially define a connector channel 614 having a Y-shaped cross-section, as shown in FIG. 6. The flared electrical connector lead-in 604 formed by first plate 606 and second plate 608 enhances the mechanical and physical properties of bus bar assembly 600. For example, flared end segments 610, 612 of first plate 606 and second plate 608 increase the heat-dissipating surface area first plate 606 and second plate 608, facilitating thermal management of heat generated by bus bar assembly 600 during operation. Additionally, flared end segments 610, 612 of first plate 606 and second plate 608 facilitate arc mitigation. Moreover, flared electrical connector lead-in 604 facilitates connection of electrical connectors by guiding and aligning electrical connectors during installation. The flared electrical connector lead-in 604 can also increase the ampacity of bus bar assembly 600 without compromising the overall width of bus bar assembly 600.

Figure 7:
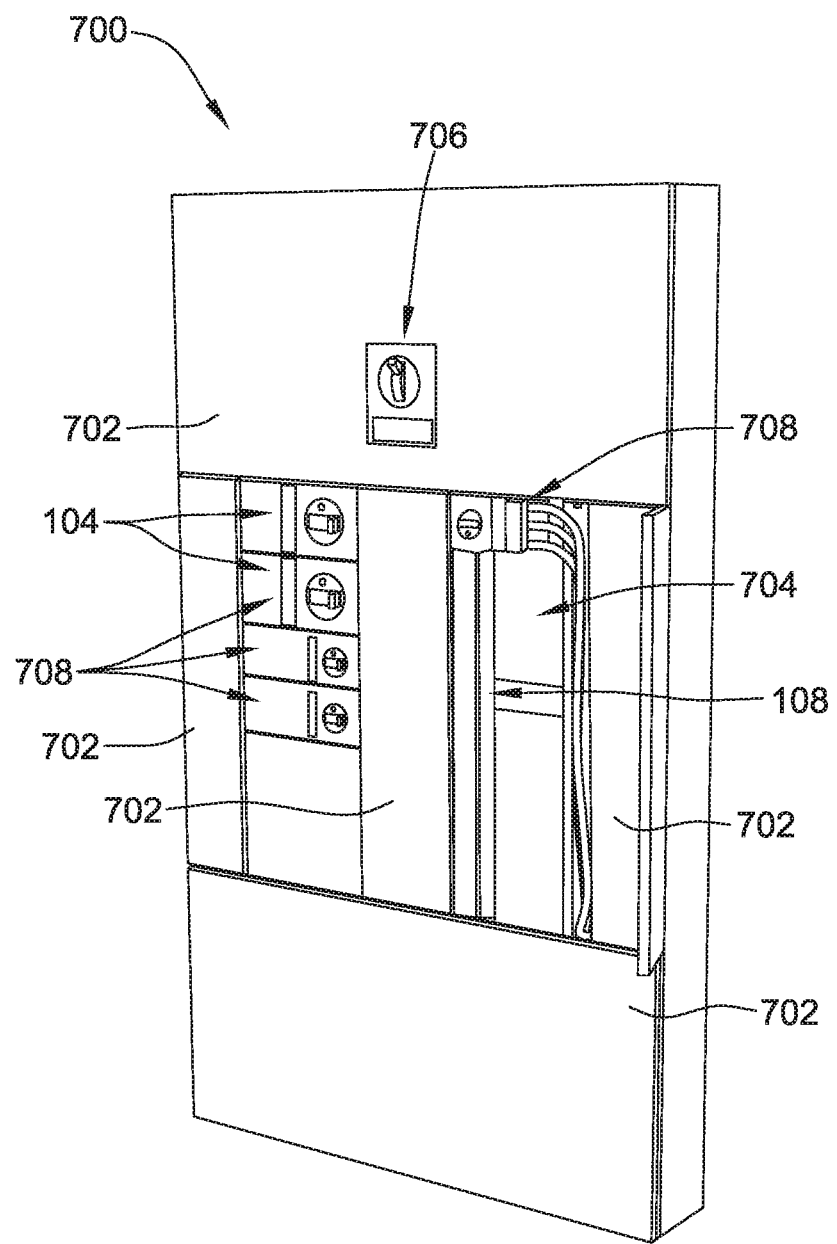
FIG. 7 is a perspective view of the electrical distribution apparatus shown in FIG. 1 disposed within an enclosure.

FIG. 7 is a perspective view of electrical distribution apparatus 102 of FIG. 1 disposed within an enclosure 700. Enclosure 700 includes a plurality of panels 702 isolating an interior volume 704 of enclosure 700 from an exterior environment. As noted above, the configuration of bus bar assembly 108 enables electrical devices, such as circuit breakers, to be electrically coupled to bus bar assembly 108 along any side of the plurality of sides defining the perimeter of bus bar assembly 108. In the embodiment illustrated in FIG. 7, for example, a main breaker 706 is electrically coupled to bus bar assembly 108 along first end 116 (FIG. 1) of bus bar assembly 108, and a plurality of branch circuit breakers 708 are electrically coupled to bus bar assembly 108 along first side 120 and second side 122 (FIG. 1). The flexibility in the location at which electrical devices 104 can be electrically coupled to bus bar assembly 108 allows bus bar assembly 108 to be mounted in a variety of orientations and positions within interior volume 704 of enclosure 700.

Figure 8:
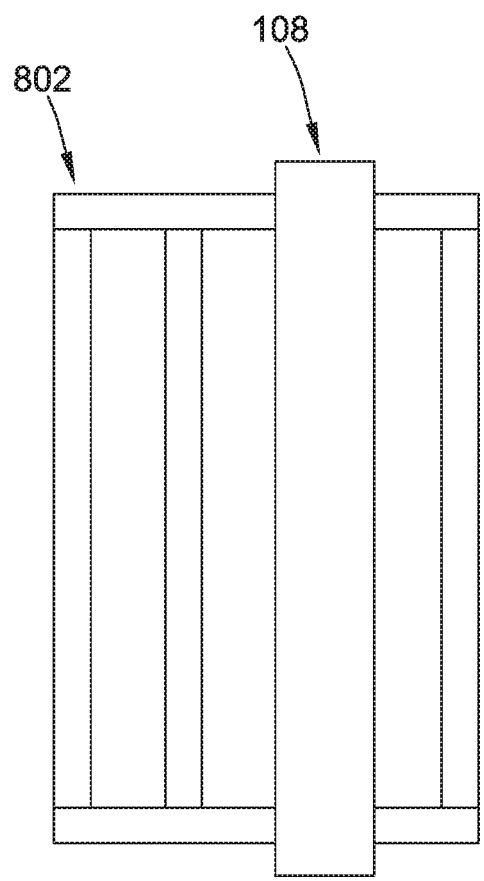
FIG. 8 is a schematic view of the bus bar assembly shown in FIGS. 1 and 2 mounted in a first orientation in which the bus bar assembly is mounted off-set with respect to a center of a frame.

FIG. 8 is a schematic view of bus bar assembly 108 mounted in a first orientation in which bus bar assembly 108 is mounted off-set with respect to a center of a frame 802.

Figure 9:
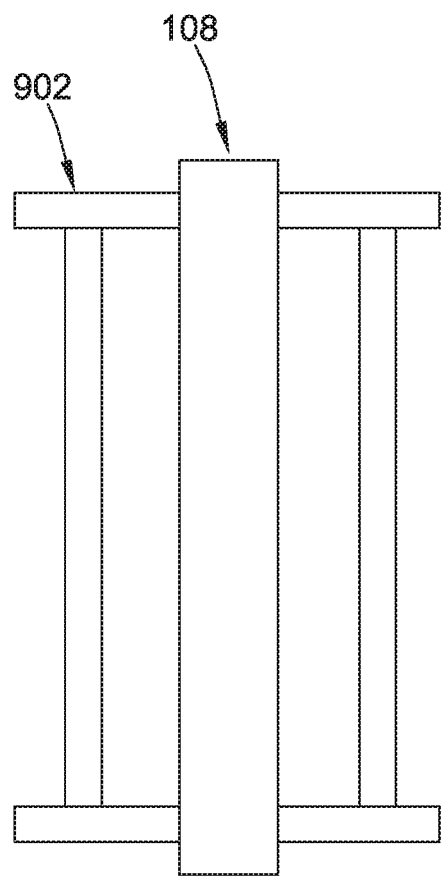
FIG. 9 is a schematic view of the bus bar assembly shown in FIGS. 1 and 2 mounted in a second orientation in which the bus bar assembly is mounted on a reduced-width frame and is substantially aligned with a center of the frame.

FIG. 9 is a schematic view of bus bar assembly 108 mounted in a second orientation in which bus bar assembly 108 is mounted on a reduced-width frame 902 and is substantially aligned with a center of frame 902.

Figure 10:
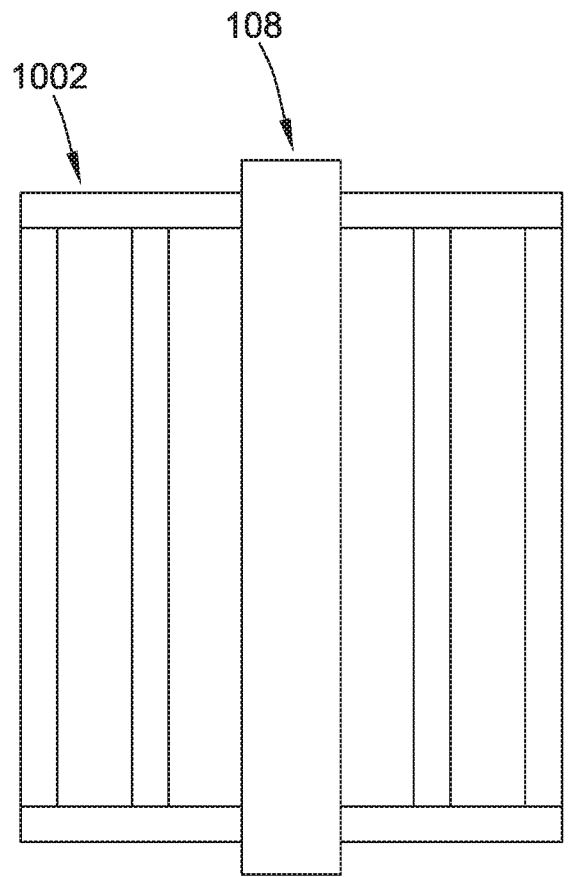
FIG. 10 is a schematic view of the bus bar assembly shown in FIGS. 1 and 2 mounted in a third orientation in which the bus bar assembly is mounted on an enhanced-width frame and is substantially aligned with a center of the frame.

FIG. 10 is a schematic view of bus bar assembly 108 mounted in a third orientation in which bus bar assembly 108 is mounted on an enhanced-width frame 1002 and is substantially aligned with a center of frame 1002.

Figure 28:
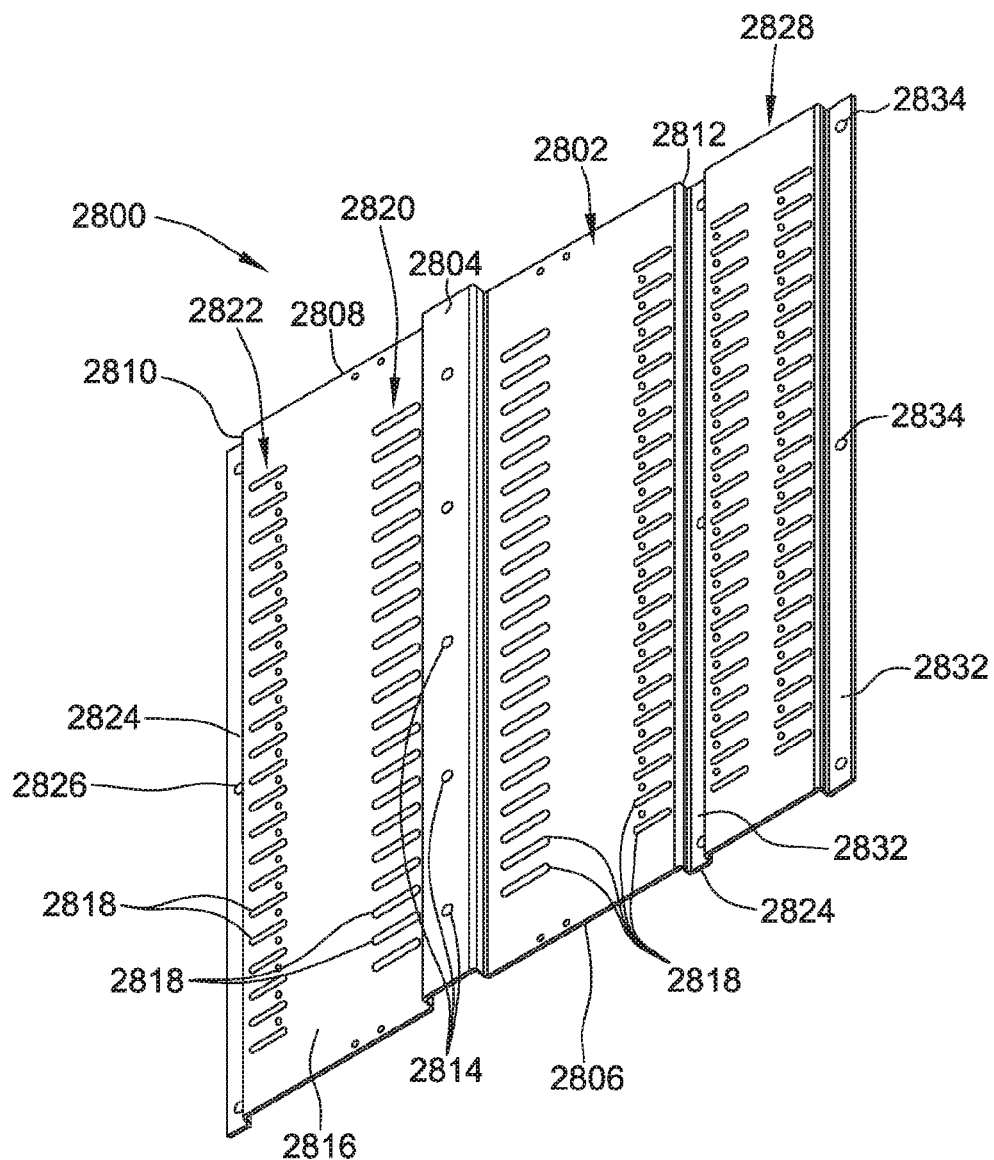
FIG. 28 is a perspective view of an exemplary modular frame assembly suitable for use with a stacked bus bar assembly, the modular frame assembly shown in a first configuration.

FIG. 28 is a perspective view of an exemplary embodiment of a modular frame assembly 2800 configured to facilitate mounting a stacked bus bar assembly, such as bus bar assembly 108, in different positions and orientations within an enclosure, such as enclosure 700. Modular frame assembly 2800 enables stacked bus bar assemblies to be mounted in different positions and orientations based on, for example, how an electrical distribution apparatus, such as electrical distribution apparatus 102 is to be configured and populated.

Modular frame assembly 2800 includes a central frame section 2802 having a mounting provision shown in the form of a raised mounting surface 2804 to which a stacked bus bar assembly may be mounted. Raised mounting surface 2804 extends in a longitudinal direction of central frame section 2802 from a first longitudinal end 2806 of central frame section 2802 to a second longitudinal end 2808 of central frame section 2802. Raised mounting surface 2804 is located approximately centrally between lateral sides 2810, 2812 of central frame section 2802 that extend from first longitudinal end 2806 to second longitudinal end 2808. Raised mounting surface 2804 includes a plurality of fastener openings 2814, each sized and shaped to receive a fastener to secure a bus bar assembly to raised mounting surface 2804.

A back plane or surface 2816 of central frame section 2802 defines a plurality of elongate slots 2818 arranged symmetrically about raised mounting surface 2804. Each elongate slot 2818 is sized and shaped to receive a fastener to secure an electrical device, such as electrical devices 104, to central frame section 2802. Elongate slots 2818 are longitudinally spaced from one another at a defined increment such that elongate slots 2818 will align with mounting features (e.g., fasteners or fastener openings) on electrical devices when the electrical devices are connected to a stacked bus bar assembly mounted on modular frame assembly 2800. The longitudinal spacing between elongate slots 2818 may be a rational fraction or multiple of one or more standard spacings between mounting features on electrical devices. Elongate slots 2818 are arranged in two rows on each side of raised mounting surface 2804, including a bus side row 2820 and a load side row 2822. Slots 2818 disposed in bus side row 2820 are positioned so as to align with a mounting feature on the bus side of an electrical device when the electrical device is connected to a stacked bus bar assembly mounted on modular frame assembly 2800. Slots 2818 disposed in load side row 2822 are positioned so as to align with a mounting feature on the load side of an electrical device when the electrical device is connected to a stacked bus bar assembly mounted on modular frame assembly 2800. Slots 2818 are elongate in the transverse direction to provide flexibility in the mounting position of electrical devices.

Central frame section 2802 includes a coupling tab 2824 disposed along each of lateral sides 2810, 2812. Coupling tabs 2824 are configured to be coupled to at least one of a plurality of extension members (described below) to extend the length and/or width of modular frame assembly 2800. Each coupling tab 2824 defines a plurality of fastener openings 2826 sized and shaped to receive a fastener to secure one of a plurality of extension members to central frame section 2802.

Figure 29:
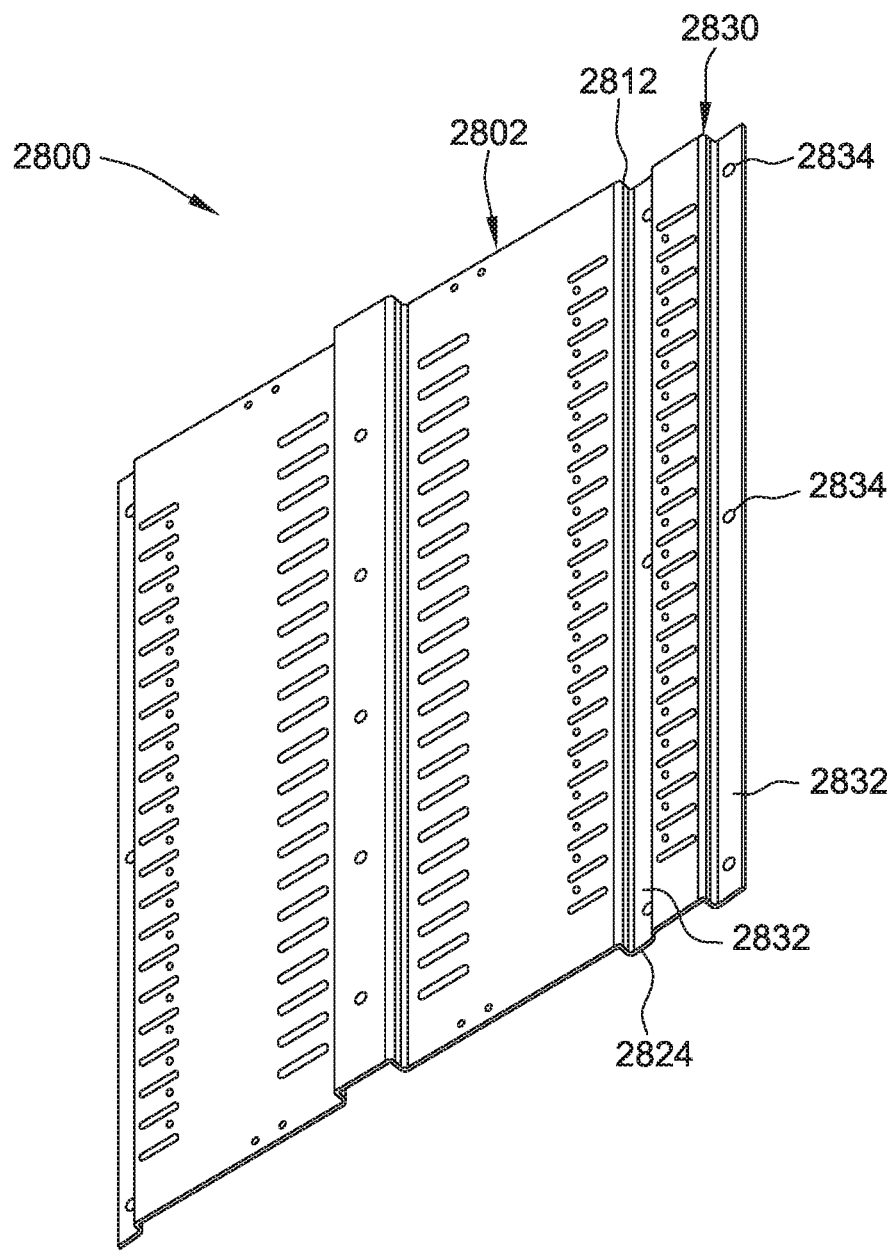
FIG. 29 is a perspective view of the modular frame assembly of FIG. 28 shown in a second configuration.

FIG. 28 illustrates modular frame assembly 2800 in a first configuration in which a first extension member 2828 is coupled to central frame section 2802 along lateral side 2812 of central frame section 2802. FIG. 29 illustrates modular frame assembly 2800 in a second configuration in which a second extension member 2830 having a width less than first extension member 2828 is coupled along lateral side 2812 of central frame section 2802. In some embodiments, no extension members are coupled to central frame section 2802, and modular frame assembly 2800 includes only central frame section 2802.

As shown in FIGS. 28 and 29, each of extension members 2828, 2830 includes a coupling tab 2832 on each lateral side of the respective extension member. The configuration of coupling tabs 2832 on each of extension members 2828, 2830 is identical such that first extension member 2828 and second extension member 2830 can be interchanged with one another. In the exemplary embodiment, each coupling tab 2832 of extension members 2828, 2830 defines a plurality of fastener openings 2834 arranged in an identical pattern as fastener openings 2826 on coupling tabs 2824 of central frame section 2802.

The arrangement of fastener openings and slots on modular frame assembly 2800 facilitates aligning and positioning stacked bus bar assemblies, such as bus bar assembly 108, in pre-determined locations within various electrical enclosures. The arrangement of fastener openings and slots on modular frame assembly 2800 also facilitates aligning electrical devices electrically connected to stacked bus bar assemblies mounted to modular frame assembly 2800 or installed into an electrical enclosure in which modular frame assembly 2800 is mounted.

The width of modular frame assembly 2800 can be modified by coupling various extension members to lateral sides 2810, 2812 of central frame section 2802. For example, modular frame assembly 2800 can be arranged in an offset configuration similar to the configuration shown in FIG. 8 by coupling a different number and/or a different type of extension members to lateral sides 2810, 2812 of central frame section 2802. Modular frame assembly 2800 can also be arranged in a centered configuration similar to the configuration shown in FIG. 9 or 10 by coupling the same type and number of extension members to each lateral side 2810, 2812 of central frame section 2802, or by not coupling any extension members to either of lateral sides 2810, 2812 of central frame section 2802. Modular frame assembly 2800 thereby facilitates the use of electrical devices and accessories, such as circuit breakers, having different sizes (e.g., lengths) and shapes and wire bend space requirements, and also provides increased compatibility with various enclosures.

The configuration of modular frame assembly 2800, particularly the common central frame section 2802 and extension members or segments that enable the width of modular frame assembly 2800 to be extended, provides modularity and flexibility for upgrades. The configuration of modular frame assembly 2800 also simplifies manufacturing by enabling the frame assembly to be constructed from smaller parts, and by reducing the number of parts required to be stored in inventory.

The symmetric layout and standardized connection point geometry of bus bar assembly 108 allows electrical device connections along all sides of the bus bar assembly 108 and flexibility in mounting orientation providing a common connection scheme for devices including, for example and without limitation, main breakers, lug connections, sub-feed connections, surge suppressor device connections, and metering device connections. Electrical devices having electrical connector layouts that do not match the electrical connection interface of bus bar assembly 108 can be electrically coupled to bus bar assembly using one or more adapters.

Figure 11:
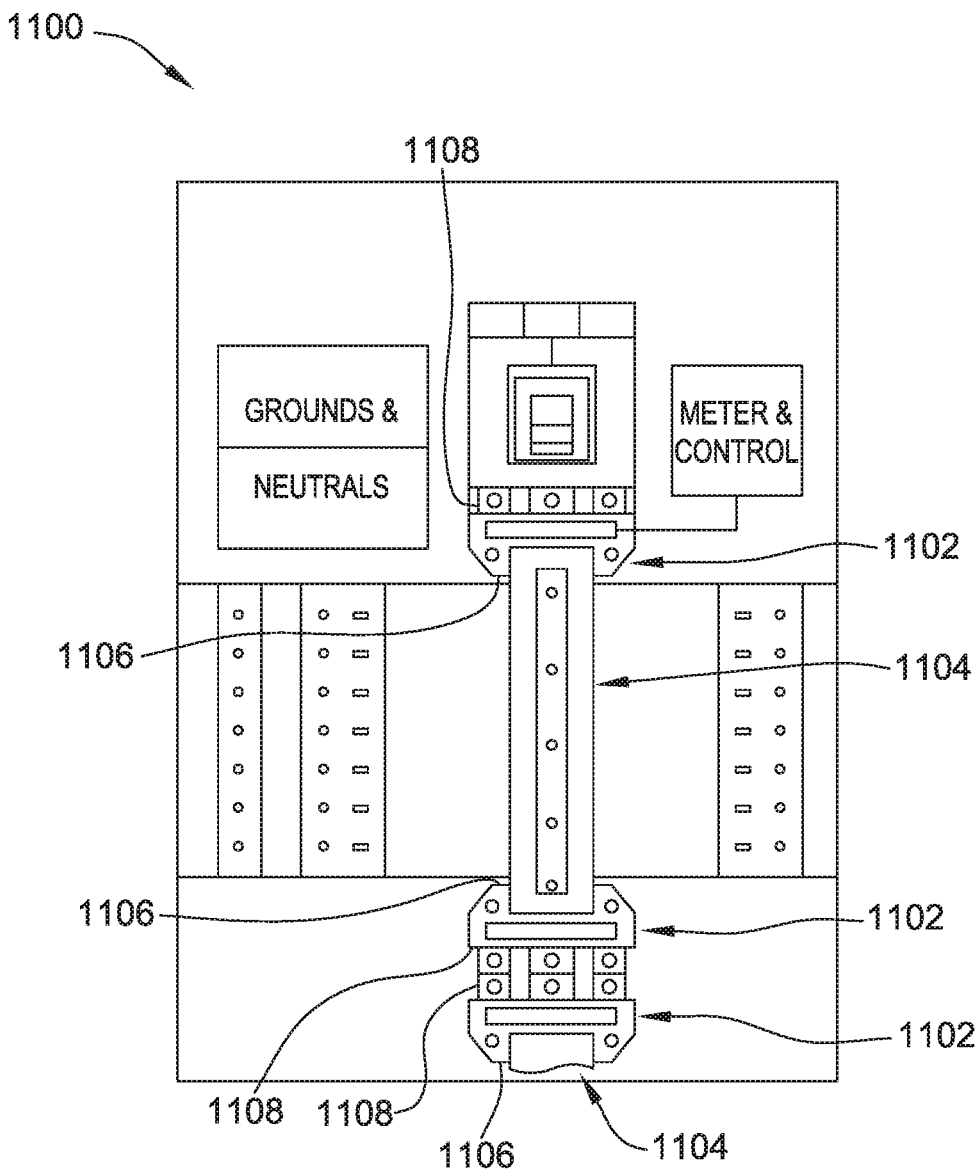
FIG. 11 is a schematic view of another embodiment of an electrical distribution system including a plurality of adapters electrically coupled to a stacked bus bar assembly.

FIG. 11 is a schematic view of another embodiment of an electrical distribution system 1100 including a plurality of adapters 1102 (broadly, interface modules) electrically coupled to a stacked bus bar assembly 1104. Bus bar assembly 1104 has the same construction and configuration as bus bar assembly 108 described above with reference to FIGS. 1 and 2.

Each adapter 1102 includes a bus bar side 1106 and a component side 1108. Bus bar side 1106 is configured to engage bus bar assembly 1104, and to provide an electrical connection for an electrical device coupled to component side 1108 of adapter 1102. Specifically, bus bar side 1106 includes a plurality of electrical connectors (not shown in FIG. 11) having an arrangement that corresponds to the electrical connection interface of bus bar assembly 1104. In the exemplary embodiment, adapter 1102 includes three electrical connectors each configured to be received in an electrical connector channel on bus bar assembly 1104. Specifically, the center-to-center spacing between adjacent pairs of electrical connectors on bus bar side 1106 of adapter 1102 corresponds to the center-to-center spacing between the electrical connector channels of bus bar assembly 1104. Moreover, each electrical connector on bus bar side 1106 of adapter 1102 is sized to be received in one of electrical connector channels on bus bar assembly 1104. In some embodiments, for example, the electrical connectors on bus bar side 1106 of adapter 1102 have a thickness slightly greater than a thickness of a corresponding electrical connector channel on bus bar assembly 1104, and the electrical connectors are configured to bend or flex to fit within one of electrical connector channels.

Component side 1108 of adapter is configured to be electrically coupled to the electrical contacts or terminals of an electrical device, and may vary depending on the type of electrical device adapter 1102 is intended to be used with. Adapters 1102 can be used to connect various electrical devices to bus bar assembly 1104, including, for example and without limitation, main lug plug-ins and bus ways.

Additionally, adapters 1102 may be used to electrically couple two or more bus bar assemblies 1104 together. In the embodiment illustrated in FIG. 11, for example, two adapters 1102 are electrically coupled to one another along the component side 1108 of each adapter, and the bus bar side 1106 of each adapter 1102 is coupled to one of bus bar assemblies 1104.

Figure 30:
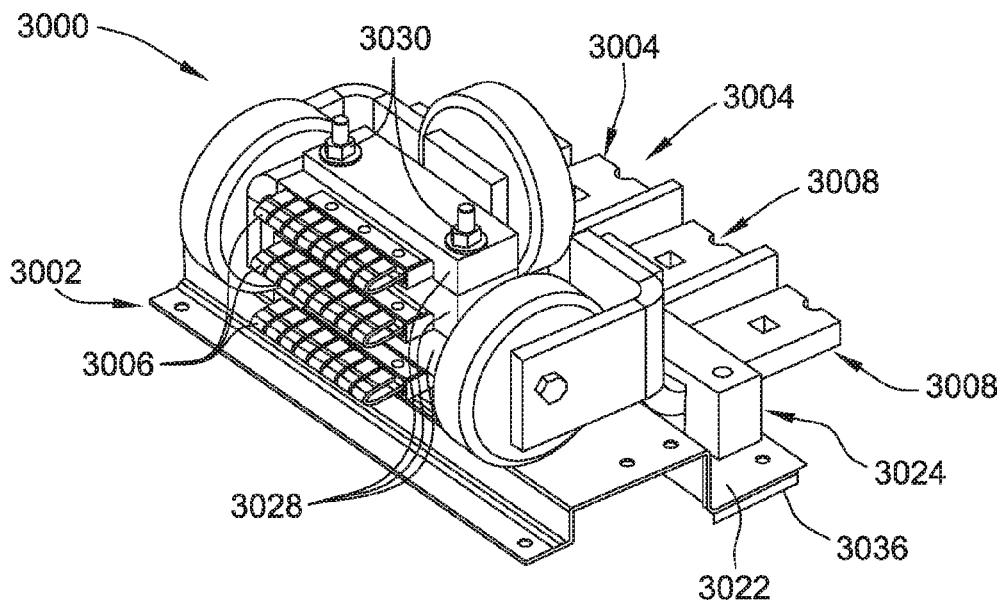
FIG. 30 is a front perspective view of an exemplary adapter suitable for use with a stacked bus bar assembly.
Figure 31:
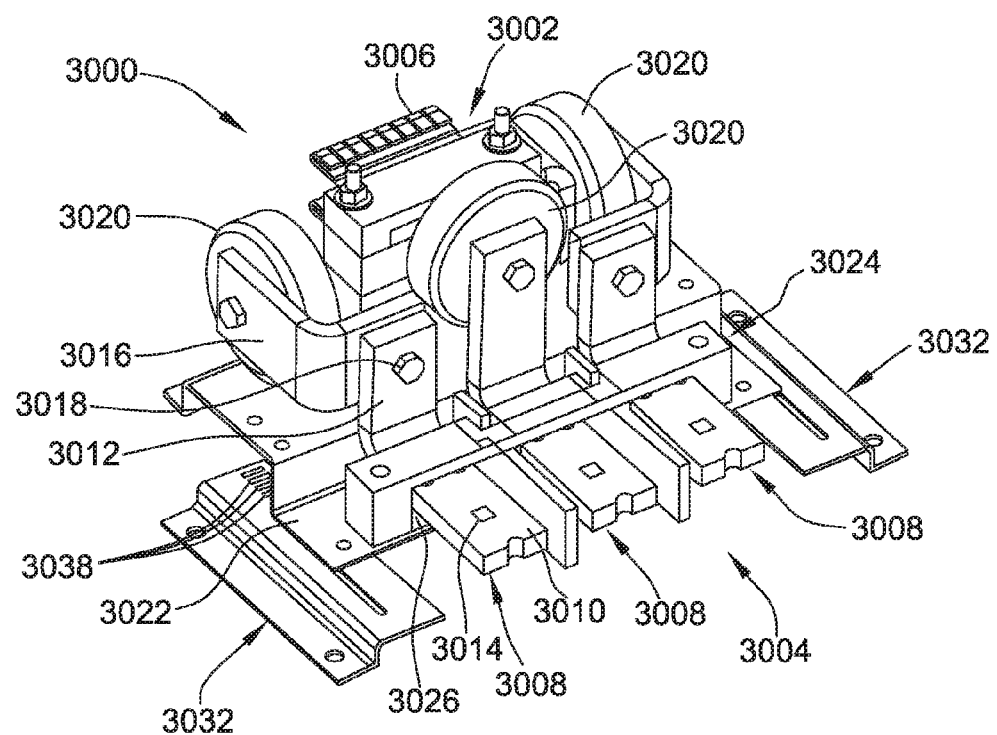
FIG. 31 is a rear perspective view of the adapter of FIG. 30.
Figure 32:
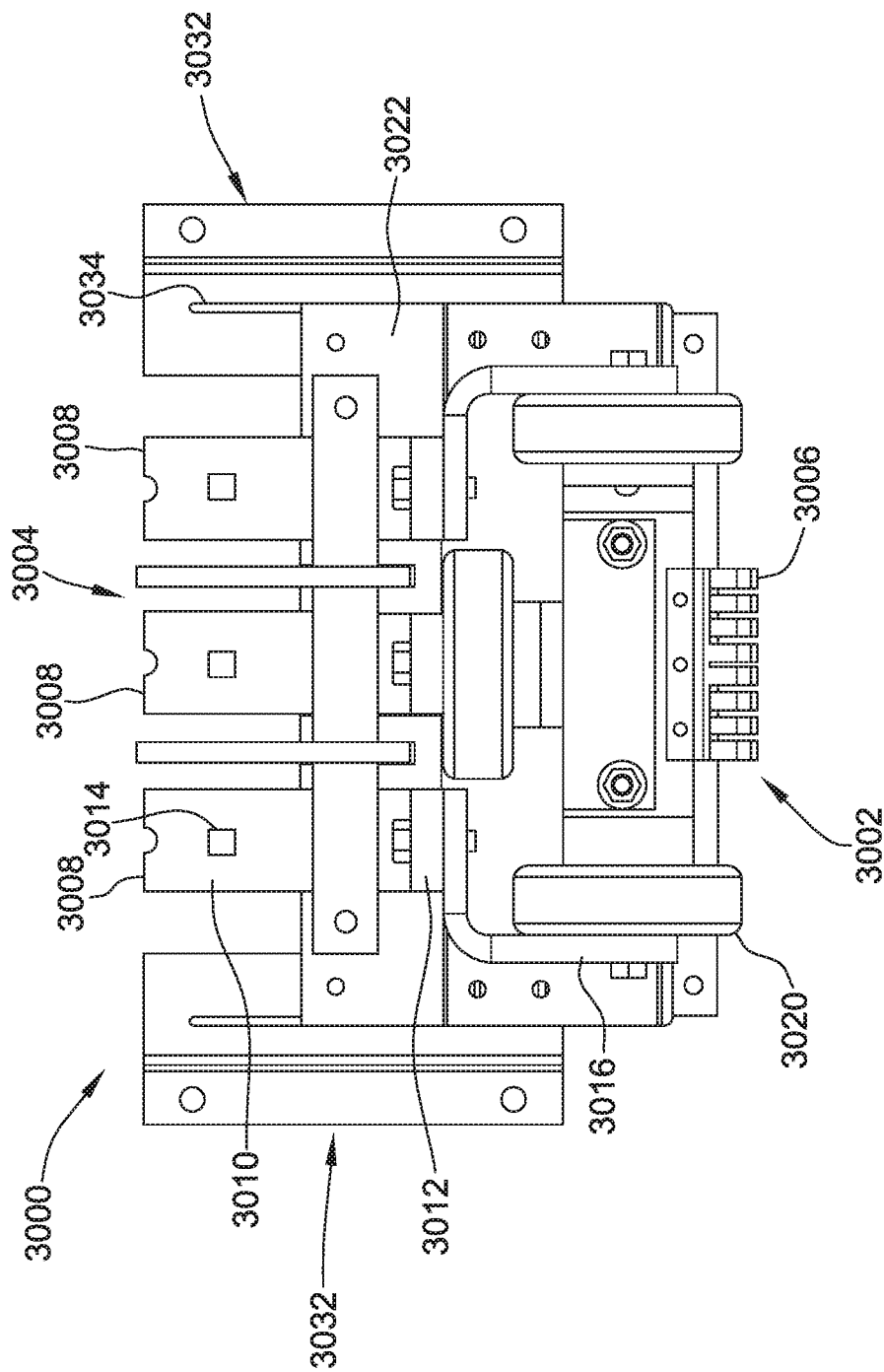
FIG. 32 is a top plan view of the adapter of FIG. 30.

FIGS. 30 and 31 are front and rear perspective views, respectively, of an exemplary adapter 3000 (broadly, an interface module) suitable for use with a stacked bus bar assembly, such as bus bar assembly 108. FIG. 32 is a top plan view of adapter 3000 shown in FIGS. 30 and 31. Adapter 3000 can be used to connect various electrical devices to a stacked bus bar assembly, such as bus bar assembly 108, including, for example and without limitation, main lug plug-ins, bus ways, circuit breakers, and other electrical devices. Adapter 3000 is particularly suitable for use in connecting electrical devices to a stacked bus bar assembly having an electrical connection interface different than the electrical connection interface of the device. Additionally, adapter 3000 may be used to electrically couple two or more stacked bus bar assemblies together, as shown in FIG. 11. Adapter 3000 may vary in size and configuration based on a required ampacity of adapter 3000, the breaker, device, and/or accessory to which adapter 3000 is intended to be connected to, and other devices or features that may be integrated into adapter 3000.

As shown in FIGS. 30-32, adapter 3000 includes a bus bar side 3002 and a component side 3004. Bus bar side 3002 is configured to engage a bus bar assembly, such as bus bar assembly 108, and to provide an electrical connection for an electrical device coupled to component side 3004 of adapter 3000. Specifically, bus bar side 3002 includes a plurality of electrical connectors 3006 having an arrangement that corresponds to the electrical connection interface of bus bar assembly 108. In the exemplary embodiment, adapter 3000 includes three electrical connectors 3006 each configured to be received in one of connector channels 218 of bus bar assembly 108 (shown in FIG. 2). Specifically, the center-to-center spacing between adjacent pairs of electrical connectors 3006 on bus bar side 3002 of adapter 3000 corresponds to center-to-center spacing 220 between adjacent connector channels 218 of bus bar assembly 108. Moreover, each electrical connector 3006 of adapter 3000 is sized to be received in one of connector channels 218. In the exemplary embodiment, electrical connectors 3006 are C-shaped connector clips, each having a configuration substantially identical to C-shaped connector clips 1404 described in more detail herein with reference to FIG. 14. In other embodiments, electrical connectors 3006 may be Y-shaped connector clips, such as Y-shaped connector clips 1402 described in more detail herein with reference to FIG. 14, or have any other suitable configuration that enables adapter 3000 to function as described herein. In yet other embodiments, adapter 3000 may include more than or less than three electrical connectors, such as two, four, or any suitable number of electrical connectors that enables adapter 3000 to function as described herein.

Component side 3004 of adapter 3000 is configured to be electrically coupled to the electrical contacts or terminals of an electrical device, and may vary depending on the type of electrical device adapter 3000 is intended to be used with. In the exemplary embodiment, component side 3004 includes a plurality of contact stabs 3008, each contact stab 3008 being electrically coupled to a respective electrical connector 3006 on bus bar side 3002 of adapter 3000. Contact stabs 3008 may have various configurations to provide for attachment directly to a circuit breaker's or accessory's connection stabs, or to accommodate terminal or compression lugs, or other devices.

As shown in FIG. 31, each contact stab 3008 includes a primary, device terminal 3010 and a secondary, intermediate terminal 3012 electrically coupled in series between one of device terminals 3010 and one of electrical connectors 3006. Device terminal 3010 is configured to be coupled to electrical contacts or terminals of an electrical device, and includes an aperture 3014 sized and shaped to receive a fastener to secure an electrical contact or terminal (e.g., copper strip or plate) to contact stab 3008. Intermediate terminal 3012 is configured to be electrically coupled to one of electrical connectors 3006 via a conductive conduit 3016, such as stamped copper plates or strips, and includes an aperture (not shown) sized and shaped to receive a fastener 3018 to secure conductive conduit 3016 to contact stab 3008.

Intermediate terminal 3012 is also positioned for coupling to secondary or auxiliary devices, such as voltage taps, current sensors or transducers, and other sensors and controls. In particular, intermediate terminal 3012 provides an electrical connection point between electrical connector 3006 and device terminal 3010 such that secondary or auxiliary devices can be integrated into adapter 3000 to provide additional features and/or functionality to adapter. In the exemplary embodiment, an integrated current transducer 3020 is electrically coupled in series between each contact stab 3008 and each electrical connector 3006 via intermediate terminal 3012. Integrated current transducers 3020 can be used to monitor the electrical current through each phase of a stacked bus bar assembly to which adapter 3000 is electrically coupled. In other embodiments, a voltage tap may be electrically coupled in series between one of electrical connectors 3006 and one of contact stabs 3008 to power a secondary or auxiliary device. In yet other embodiments, any other suitable sensor and control may be electrically coupled in series between one of electrical connectors 3006 and one of contact stabs 3008 by coupling the sensor or control to intermediate terminal 3012.

Each contact stab 3008 is adjustably coupled to a mounting bracket 3022 such that the lateral spacing between adjacent contact stabs 3008 can be readily adjusted, for example, for field adjustments. More specifically, each contact stab 3008 is releasably coupled to mounting bracket 3022 by a component side insulating member 3024. Component side insulating member 3024 is constructed from an electrically insulative material, and electrically insulates contact stabs 3008 from one another. Component side insulating member 3024 defines a plurality of openings 3026, each sized and shaped to receive one of contact stabs 3008 therein, and includes a plurality of retaining elements (not show) disposed on a bottom of component side insulating member 3024. The retaining elements are configured to engage mounting bracket 3022 to releasably couple component side insulating member 3024 and contact stabs 3008 to mounting bracket 3022. To adjust the lateral spacing between adjacent contact stabs 3008, component side insulating member 3024 is decoupled from mounting bracket 3022 and interchanged with another component side insulating member (not shown) having openings spaced apart by a desired lateral spacing. Each contact stab 3008 is positioned in a corresponding one of the openings defined in the component side insulating member, and the component side insulating member is then coupled to mounting bracket 3022.

In other embodiments, adapter 3000 includes a plurality of separate component side insulating members, each corresponding to one of contact stabs 3008. Each of the separate component side insulating members is releasably coupled to mounting bracket, and allows independent adjustment of contact stabs 3008. That is, contact stabs 3008 can be moved independently of other contact stabs 3008 along mounting bracket 3022 via the separate component side insulating members.

Electrical connectors 3006 are fixed in spaced relationship to one another by a stack of bus side insulating members 3028. Bus side insulating members 3028 maintain the relative position of electrical connectors 3006 to one another, and electrically insulate adjacent electrical connectors 3006 from one another. In the exemplary embodiment, bus side insulating members 3028 are secured to mounting bracket 3022 via fasteners 3030.

The component side insulating member 3024 and the bus side insulating members 3028 may also facilitate heat dissipation between phases within the adapter 3000, and act as mechanical supports or bracing to reduce flexing and/or movement of components within the adapter 3000. In some embodiments, adapter 3000 may include a bus side insulating member having an exhaust port, similar to bus side insulating member 1604 described in more detail herein with reference to FIGS. 16 and 17, to channel or direct exhaust gases from a breaker or other electrical device connected to adapter 3000 into an exhaust channel (e.g., exhaust channel 2132, shown in FIG. 22) and/or to a designated area within an electrical enclosure in which adapter 3000 is mounted.

As shown in FIGS. 31 and 32, in the exemplary embodiment, adapter 3000 includes frame mounting brackets 3032 to facilitate mounting adapter to a frame in various positions and orientations. Each frame mounting bracket 3032 defines an elongate slot 3034 sized and shaped to receive a retention member 3036 (FIG. 30) of mounting bracket 3022 to slidably couple frame mounting bracket 3032 to mounting bracket 3022. Each frame mounting bracket 3032 also includes a plurality of fastener openings 3038 sized and shaped to receive a fastener to secure mounting bracket 3022 to frame mounting bracket 3032. In some embodiments, mounting bracket 3022 and/or frame mounting bracket 3032 are configured to be mounted to components other than a frame, such as directly to a stacked bus bar assembly (e.g., bus bar assembly 108), or to an enclosure in which adapter 3000 and a stacked bus bar assembly are housed.

Figure 12:
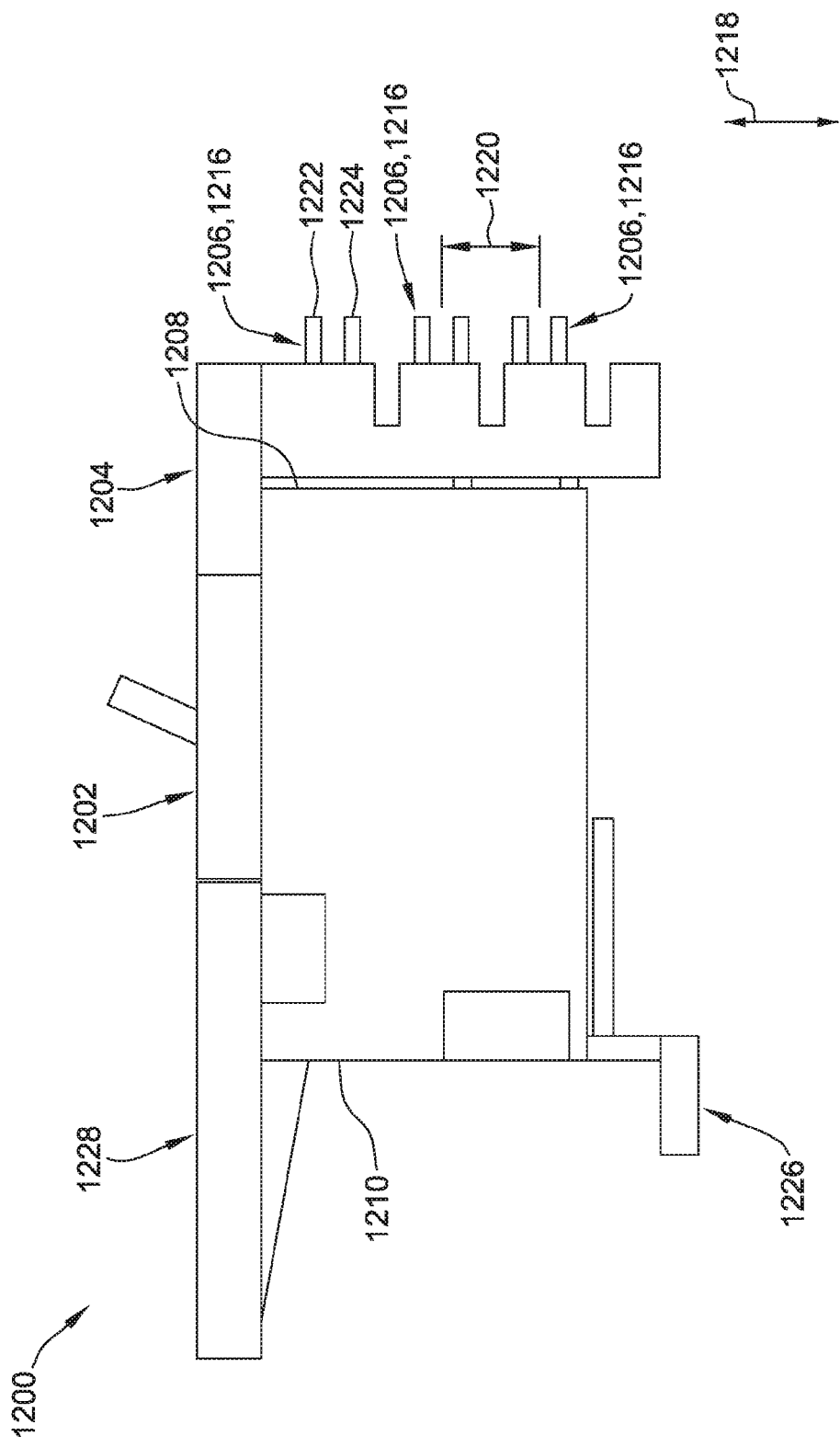
FIG. 12 is a schematic view of an exemplary electrical device suitable for use with the electrical distribution system and the electrical distribution apparatus shown in FIG. 1
Figure 13:
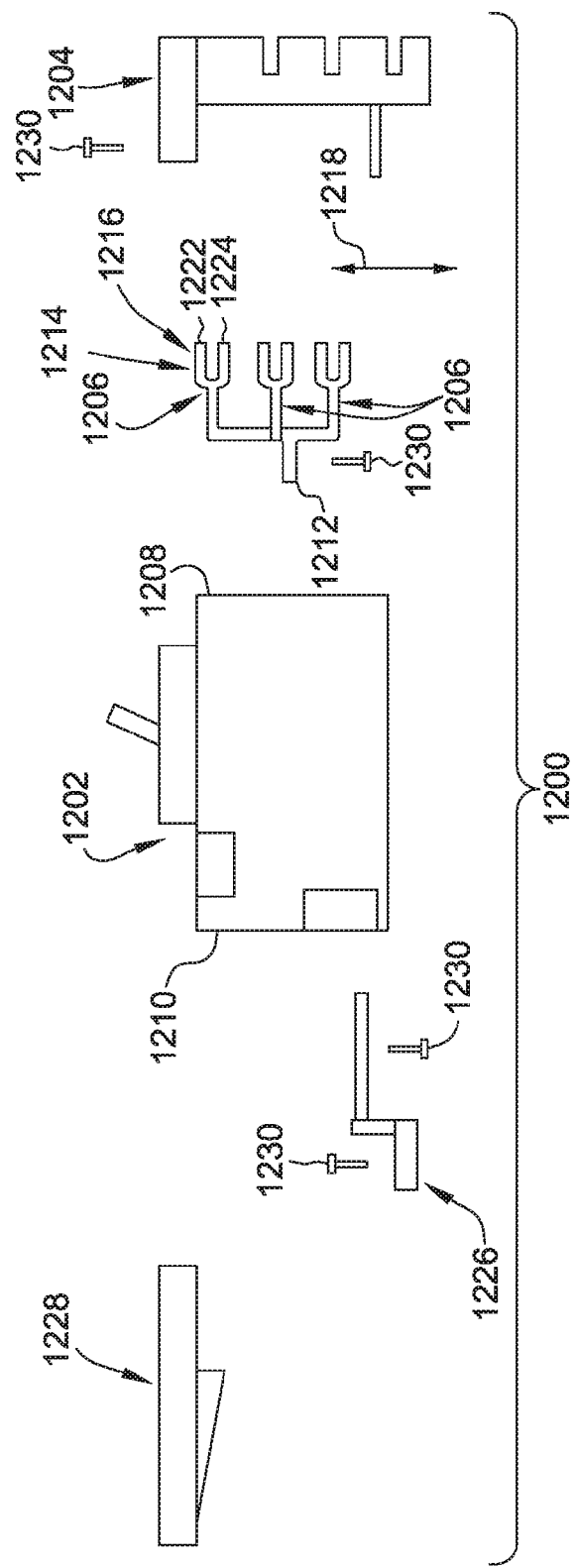
FIG. 13 is an exploded view of the electrical device shown in FIG. 12.

FIG. 12 is a schematic view of an exemplary electrical device 1200 suitable for use with electrical distribution system 100 and electrical distribution apparatus 102 shown in FIG. 1. FIG. 13 is an exploded view of electrical device 1200 shown in FIG. 12. In the exemplary embodiment, electrical device 1200 is a circuit breaker including a breaker unit 1202, a bus side insulating member 1204, and a plurality of electrical connectors 1206. Although electrical device 1200 is described with reference to a circuit breaker, electrical devices other than circuit breakers may be used with electrical distribution system 100 and electrical distribution apparatus 102 shown in FIG. 1, including, for example and without limitation, circuit switching devices, electrical meters, and circuit interrupters other than circuit breakers, such as contactors, motor starters, motor controllers and other load controllers.

Breaker unit 1202 includes a bus side 1208 and a load side 1210. Bus side 1208 includes a plurality of conductive line terminals (not shown) each electrically coupled to one of electrical connectors 1206 when electrical device 1200 is assembled. Load side 1210 includes a plurality of load terminals (e.g., contact stabs, not shown) configured to be electrically coupled to a load. Breaker unit 1202 also includes an internal trip mechanism (not shown) configured to interrupt an electrical connection between a bus bar assembly coupled to bus side 1208 of breaker unit 1202 and a load electrically coupled to load side 1210 of breaker unit 1202 by separating separable contacts within breaker unit 1202 upon detection of an overload or overcurrent condition.

Each electrical connector 1206 includes a first end 1212 configured to be electrically coupled to one of the line terminals of breaker unit 1202, and a second end 1214 configured to be electrically coupled to one of bus bars 202 of bus bar assembly 108 (FIG. 2).

As shown in FIG. 13, each electrical connector 1206 includes a connector clip 1216 disposed at second end 1214 of the corresponding electrical connector 1206. In the exemplary embodiment, connector clip 1216 is formed as a unitary part of electrical connector 1206. In other embodiments, electrical connectors 1206 may include a conductive element separate from connector clip 1216, such as a contact stab, interconnecting connector clip 1216 and a line terminal of breaker unit 1202. Electrical connectors 1206 and connector clip 1216 may be constructed from any suitable conductive materials including, for example and without limitation, copper, aluminum, and combinations thereof.

When electrical device 1200 is assembled, adjacent connector clips 1216 are spaced apart from one another in a first direction, indicated by arrow 1218, which corresponds to vertical direction 204 of bus bar assembly 108 (FIG. 2). Moreover, the center-to-center spacing 1220 between each pair of adjacent connector clips 1216 is substantially equal to center-to-center spacing 220 between connector channels 218 (FIG. 2) of adjacent pairs of bus bars 202 of bus bar assembly 108. Further, each connector clip 1216 has a thickness that is slightly greater than a thickness of connector channels 218 such that each connector clip 1216 is deflected or compressed when inserted into a respective one of connector channels 218.

Each connector clip 1216 is configured to engage first plate 210 and second plate 212 of one of bus bars 202 of bus bar assembly 108 (FIG. 2). In the exemplary embodiment, each connector clip 1216 includes a first contact segment 1222 configured to engage one of first plate 210 and second plate 212 (FIG. 2), and a second contact segment 1224 configured to engage the other of first plate 210 and second plate 212. First contact segment 1222 is spaced from second contact segment 1224 in first direction 1218. Moreover, each connector clip 1216 is constructed from a flexible, resilient conductive strip or sheet such that first contact segment 1222 is biased away from second contact segment 1224 in first direction 1218. First contact segment 1222 and second contact segment 1224 are thus configured to deflect towards one another when connector clip 1216 engages first plate 210 and second plate 212, and maintain contact with first plate 210 and second plate 212 due to the biasing force between first contact segment 1222 and second contact segment 1224.

In some embodiments, one or more of connector clips 1216 may include an expansion support spring (not shown) disposed between first contact segment 1222 and second contact segment 1224 to support first contact segment 1222 and second contact segment 1224, and maintain a constant expansion force against a contact surface of first plate 210 and second plate 212. Examples of suitable expansion support springs include, for example and without limitation, coil springs and leaf springs.

Bus side insulating member 1204 is coupled to bus side 1208 of breaker unit 1202, and is configured to provide electrical insulation between electrical connectors 1206. Moreover, bus side insulating member is configured to support electrical connectors 1206, and maintain a position and spacing between electrical connectors 1206. Bus side insulating member 1204 is constructed from an electrically insulative material.

In the exemplary embodiment, electrical device 1200 also includes a mounting bracket 1226 for mounting breaker unit 1202 to frame 106 (FIG. 1), and a cover panel 1228 configured to fill voids remaining between panels 702 of enclosure 700 (FIG. 7) and breaker unit 1202 when breaker unit 1202 is installed in electrical distribution system 100 (FIG. 1).

Components of electrical device 1200 may be coupled together by any suitable coupling means that enables electrical device 1200 to function as described herein. In the exemplary embodiment, electrical connectors 1206, bus side insulating member 1204, and mounting bracket 1226 are each coupled to breaker unit 1202 by fasteners 1230. Fasteners 1230 may include, for example and without limitation, screws, bolts, pins, or any other suitable fastener that enables electrical device 1200 to function as described herein. Further, in the exemplary embodiment, cover panel 1228 is coupled to breaker unit 1202 by a press-fit connection.

Figure 14:
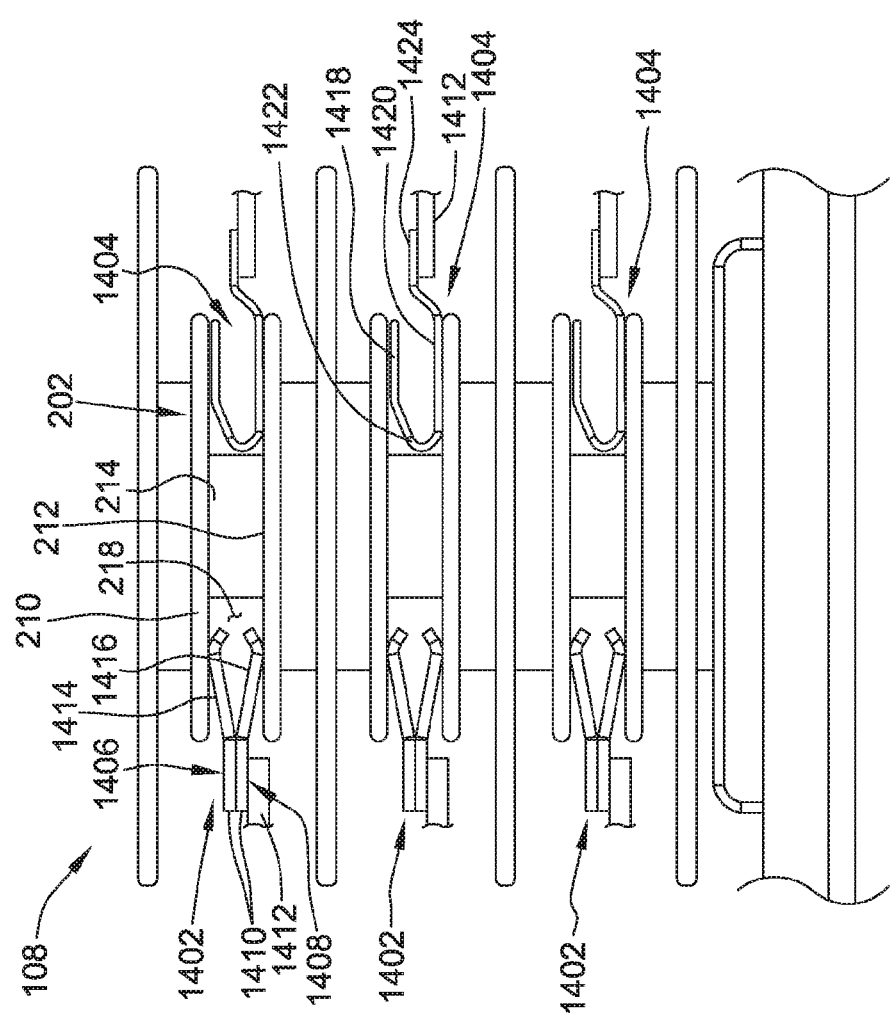
FIG. 14 is an end view of the bus bar assembly shown in FIG. 2 having a plurality of electrical connectors coupled thereto.

FIG. 14 is an end view of bus bar assembly 108 of FIG. 2 having a plurality of electrical connectors coupled thereto. Specifically, a plurality of Y-shaped connector clips 1402 are coupled to one side of bus bar assembly 108, and a plurality of C-shaped connector clips 1404 are coupled to the other side of bus bar assembly 108.

As shown in FIG. 14, each Y-shaped connector clip 1402 includes a first contact member 1406 and a second contact member 1408 coupled to one another along a respective adjoining segment 1410 of each of first contact member 1406 and second contact member 1408. Adjoining segments 1410 are coupled to a contact stab 1412 of a breaker unit (not shown in FIG. 14). In the illustrated embodiment, first contact member 1406 and second contact member 1408 are constructed from separate pieces of conductive material, such as copper strips or sheets, although in other embodiments, first contact member 1406 and second contact member 1408 may be formed integrally with one another.

First contact member 1406 includes a first contact segment 1414 engaging first plate 210, and second contact member 1408 includes a second contact segment 1416 engaging second plate 212. Each of first contact segment 1414 and second contact segment 1416 emanate from a respective adjoining segment 1410 of first contact member 1406 and second contact member 1408, and extend outward at an oblique angle thereto. As shown in FIG. 14, first contact segment 1414 includes a distal end angled towards second contact segment 1416, and second contact segment 1416 includes a distal end angled towards first contact segment 1414. The angled distal ends of first and second contact segments 1414, 1416 facilitate insertion of connector clip 1402 into connector channel 218.

In Y-shaped connector clips 1402, first contact segment 1414 and second contact segment 1416 are electrically coupled to one another only through adjoining segments 1410. As a result, Y-shaped connector clips 1402 provide multiple conductive paths between bus bars 202 and contact stabs 1412 of breaker units, and facilitate load balancing across connector clips.

Each C-shaped connector clip 1404 is formed from a unitary piece of conductive material, such as a copper sheet or strip, and includes a first contact segment 1418, a second contact segment 1420, and a C-shaped spring or biasing element 1422 interconnecting first contact segment 1418 and second contact segment 1420. Biasing element 1422 biases first contact segment 1418 and second contact segment 1420 away from one another. Biasing element 1422 is integrally formed with first contact segment 1418 and second contact segment 1420. That is, first contact segment 1418, second contact segment 1420, and biasing element 1422 are constructed from a single, continuous piece of conductive material, such as a copper strip or sheet.

When C-shaped connector clip 1404 is in a compressed configuration, such as when C-shaped connector clip 1404 is inserted into one of connector channels 218, biasing element 1422 biases first contact segment 1418 against first plate 210, and biases second contact segment 1420 against second plate 212. C-shaped connector clip 1404 also includes a connecting segment 1424 connected to a contact stab 1412 of a breaker unit (not shown in FIG. 14).

The biasing force between the first contact segments and the second contact segments of the above-described connector clips facilitates maintaining electrical contact between the connector clips and bus bars 202 of bus bar assembly 108. Additionally, the bus bars 202 and connector clips are configured such that the electromagnetic fields generated by current flowing through the bus bars creates an additional expansive force on first and second contact segments against a respective plate of bus bars 202.

Figure 33:
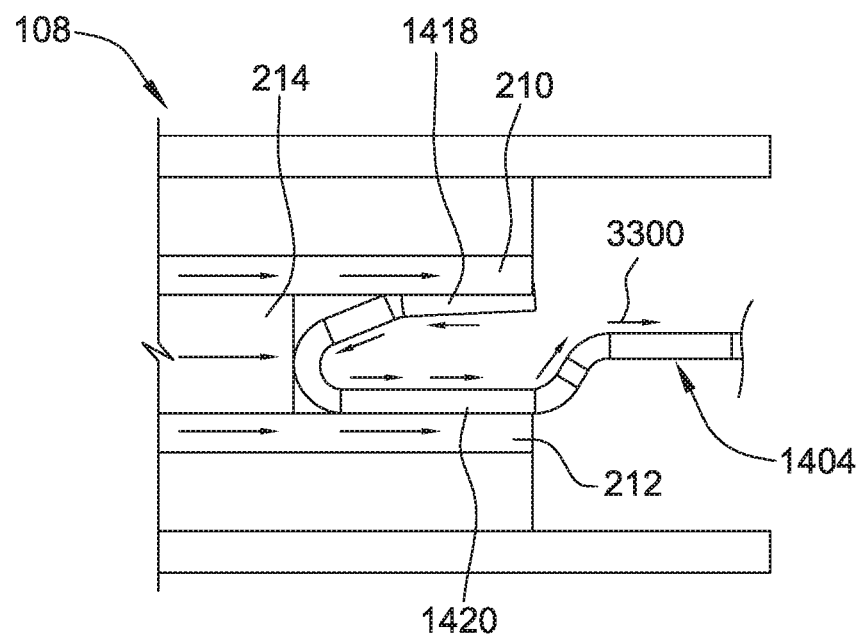
FIG. 33 is an enlarged schematic view of the bus bar assembly and one of the electrical connectors shown in FIG. 14 illustrating an instantaneous direction of current flow through the bus bar assembly and the electrical connector during operation.

FIG. 33 is an enlarged schematic view of bus bar assembly 108 and C-shaped connector clip 1404 of FIG. 14 illustrating the instantaneous direction of current flow through bus bar assembly 108 and C-shaped connector clip 1404 during operation. The direction of current flow is indicated by arrows 3300 in FIG. 33. As shown in FIG. 33, the configuration of C-shaped connector clip 1404 and bus bar assembly 108 creates a reverse-current loop that generates electromagnetic attractive and repulsive forces that facilitate maintaining electrical contact between C-shaped connector clip 1404 and bus bar assembly 108. Without being bound by any particular theory, it is believed that electromagnetic repulsive forces between first contact segment 1418 and second contact segment 1420 bias first contact segment 1418 and second contact segment 1420 away from one another and into engagement with first plate 210 and second plate 212, respectively, and thereby facilitate maintaining electrical contact between C-shaped connector clip 1404 and bus bar assembly 108.

Figure 15:
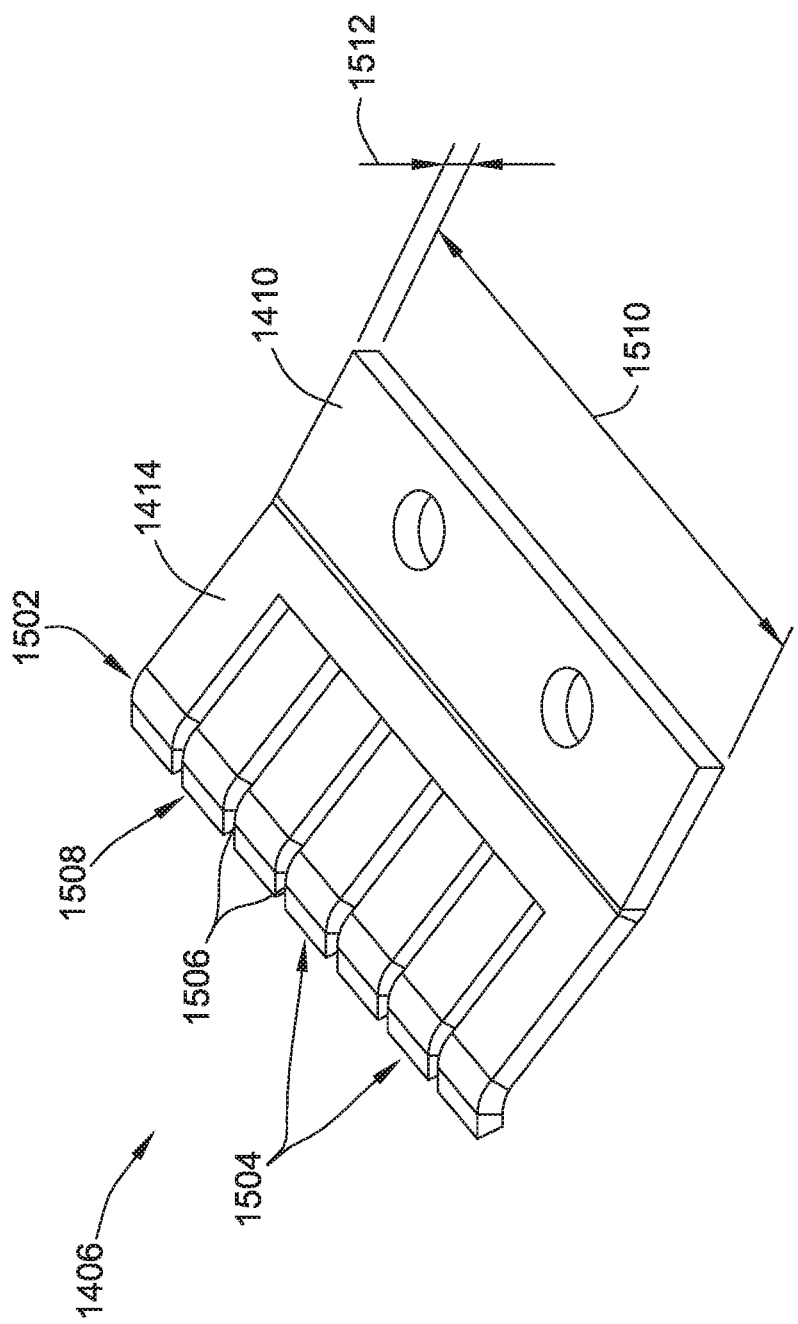
FIG. 15 is a perspective view of a first contact member of one of the electrical connectors shown in FIG. 14.

FIG. 15 is a perspective view of first contact member 1406 of one of Y-shaped connector clips 1402 shown in FIG. 14. As shown in FIG. 15, first contact segment 1414 includes a contoured contact surface 1502 to accommodate slight misalignments between connector clips and connector channels on bus bars during installation of an electrical device. Contoured contact surface 1502 also enables slight pivoting of connector clips relative to bus bars while connector clips are engaged with bus bars, and thus facilitate reducing stress in the connection between connector clips and bus bars.

Also, as shown in FIG. 15, first contact segment 1414 includes a plurality of contact fingers 1504 separated from one another by grooves 1506 extending into first contact member 1406 from a distal end 1508. Segmented contact fingers 1504 are depressible independently of one another. That is, contact fingers 1504 are configured to flex or deflect independently of one another to provide additional flexibility to first contact member 1406 to facilitate accommodating variations in the contact surface of bus bars and other tolerance variations.

The ampacity of connector clips (e.g., connector clips 1216, 1402, 1404) may be varied by adjusting a width 1510 or a thickness 1512 of one or more components of connector clips (e.g., first contact member 1406 and/or second contact member 1408). As noted above, connector clips may be made as a single unitary piece, or as a series of multiple pieces to achieve a desired ampacity.

In some embodiments, Y-shaped connector clips 1402 and/or C-shaped connector clips 1404 may include a support spring to improve clip retention reliability, reduce or minimize the effects of material fatigue, and to reinforce the inherent biasing force of Y-shaped connector clips 1402 and C-shaped connector clips 1404.

Figure 34:
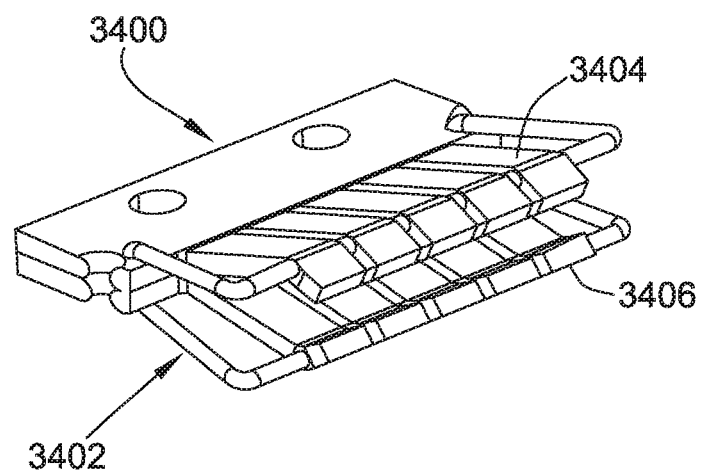
FIG. 34 is a perspective view of a Y-shaped connector clip including a support spring.

FIG. 34, for example, is a perspective view of a Y-shaped connector clip 3400 including a support spring 3402 coupled to both a first contact segment 3404 and a second contact segment 3406 of Y-shaped connector clip 3400. Support spring 3402 has a flexural strength greater than a flexural strength of first contact segment 3404 and second contact segment 3406, and is configured to bias first contact segment 3404 and second contact segment 3406 away from one another and towards a relaxed position.

Figure 35:
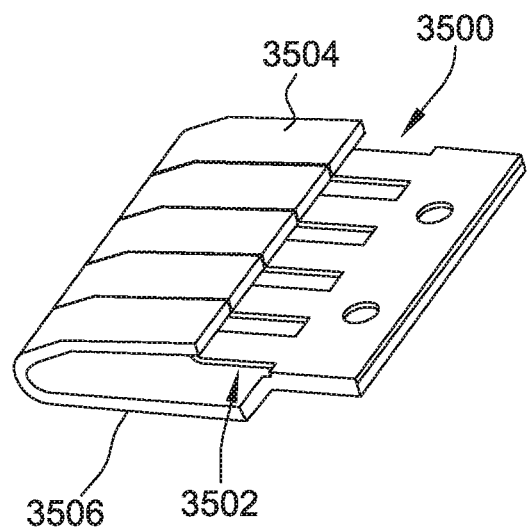
FIG. 35 is a perspective view of a C-shaped connector clip including a support spring.
Figure 36:
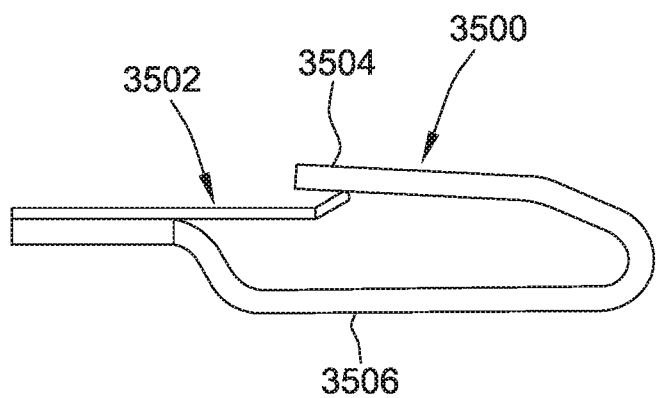
FIG. 36 is a side view of the C-shaped connector clip shown in FIG. 35.

FIG. 35 is a perspective view of a C-shaped connector clip 3500 including a support spring 3502, and FIG. 36 is a side view of C-shaped connector clip 3500 shown in FIG. 35. In the embodiment shown in FIGS. 35 and 36, support spring 3502 is coupled to only one of a first contact segment 3504 and a second contact segment 3506 of C-shaped connector clip 3500. In the illustrated embodiment, support spring 3502 is coupled to first contact segment 3504. Support spring 3502 has a flexural strength greater than a flexural strength of first contact segment 3504 and second contact segment 3506, and is configured to bias first contact segment 3504 and second contact segment 3506 away from one another and towards a relaxed position.

Figure 16:
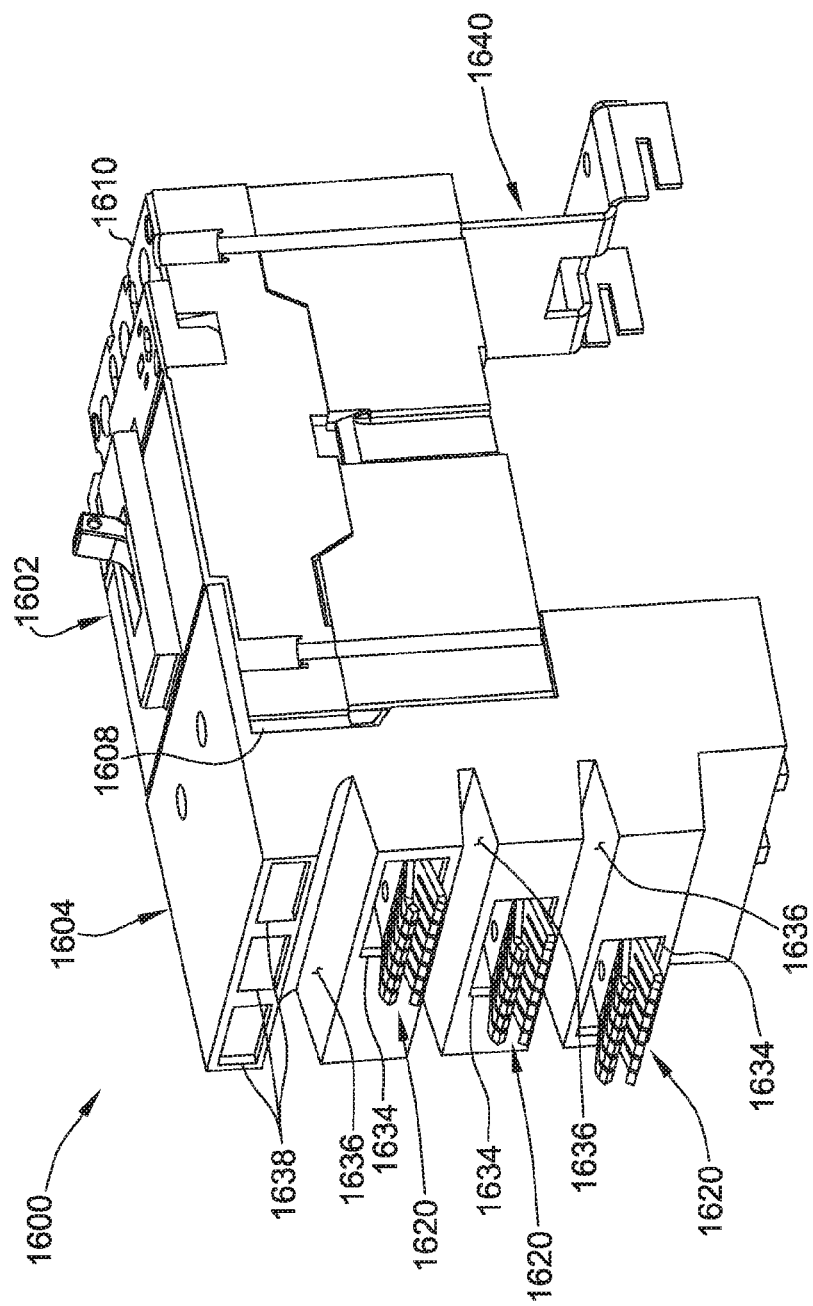
FIG. 16 is a perspective view of another embodiment of an electrical device suitable for use with the electrical distribution system and the electrical distribution apparatus shown in FIG. 1.
Figure 17:
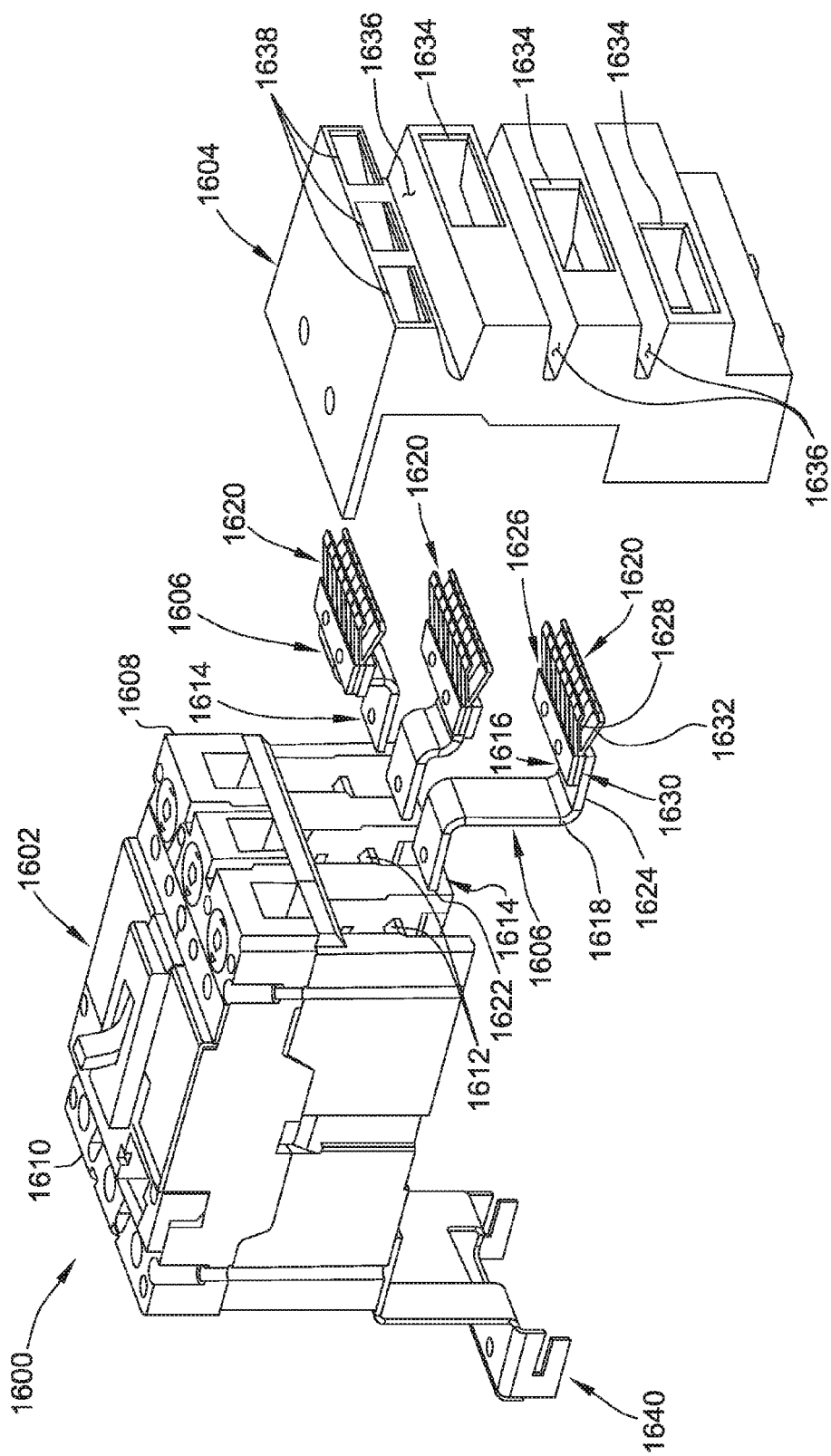
FIG. 17 is a partially exploded view of the electrical device shown in FIG. 16.

FIG. 16 is a perspective view of another embodiment of an electrical device 1600 suitable for use with electrical distribution system 100 and electrical distribution apparatus 102 shown in FIG. 1. FIG. 17 is a partially exploded view of electrical device 1600 shown in FIG. 16.

As shown in FIGS. 16 and 17, electrical device 1600 includes a breaker unit 1602, a bus side insulating member 1604, and a plurality of electrical connectors 1606.

Breaker unit 1602 includes a bus side 1608 and a load side 1610. Bus side 1608 includes a plurality of conductive line terminals 1612 (FIG. 17), and load side 1610 includes a plurality of load terminals (not shown) configured to be electrically coupled to a load. When breaker unit 1602 is assembled, each conductive line terminal 1612 is electrically coupled to one of electrical connectors 1606.

Breaker unit 1602 also includes an internal trip mechanism (not shown) configured to interrupt an electrical connection between a bus bar assembly coupled to bus side 1608 of breaker unit 1602 and a load electrically coupled to load side 1610 of breaker unit by separating separable contacts within breaker unit 1602 upon detection of an overload or overcurrent condition.

Each electrical connector 1606 includes a first end 1614 configured to be electrically coupled to one of the line terminals 1612 of breaker unit 1602, and a second end 1616 configured to be electrically coupled to one of bus bars 202 of bus bar assembly 108 (FIG. 2).

In the embodiment illustrated in FIGS. 16 and 17, each electrical connector 1606 includes a contact stab 1618 and a connector clip 1620. Contact stab 1618 includes a first end 1622 configured to be electrically coupled to one of the line terminals 1612 of breaker unit 1602, and second end 1624. Connector clip 1620 is coupled to second end 1624 of contact stab 1618.

In the embodiment illustrated in FIGS. 16 and 17, connector clips 1620 are Y-shaped connector clips including a first contact member 1626 having a first contact segment 1628, and a second contact member 1630 having a second contact segment 1632. In other embodiments, electrical device 1600 may include connector clips other than Y-shaped connector clips, such as C-shaped connector clips 1404 (FIG. 14).

Bus side insulating member 1604 is coupled to bus side 1608 of breaker unit 1602, and is configured to provide electrical insulation between electrical connectors 1606. Moreover, bus side insulating member is configured to support electrical connectors 1606, and maintain a position and spacing between electrical connectors 1606. Bus side insulating member 1604 is constructed from an electrically insulative material.

As shown in FIGS. 16 and 17, bus side insulating member 1604 includes a plurality of connector clip openings 1634.

Each connector clip opening 1634 is sized and shaped to receive one of connector clips 1620 therein. Moreover, bus side insulating member 1604 defines a plurality of grooves 1636 each sized and shaped to receive at least a portion of one of bus bar insulators 208 (FIG. 2) therein. In the exemplary embodiment, bus side insulating member 1604 also defines exhaust ports 1638 through which pressurized gas and/or other airborne particles are exhausted from electrical device 1600. Exhaust ports 1638 are coupled in fluid communication with an interior chamber (not shown) of breaker unit 1602 in which gaseous materials are generated during a short circuit or trip event (e.g., resulting from separation of electrical contacts within breaker unit 1602). Bus side insulating member 1604 tapers inward towards exhaust ports 1638 so as to direct pressurized gas generated within breaker unit 1602 out of breaker unit 1602.

In the illustrated embodiment, electrical device 1600 also includes a mounting bracket 1640 for mounting breaker unit 1602 to frame 106 (FIG. 1).

Figure 18:
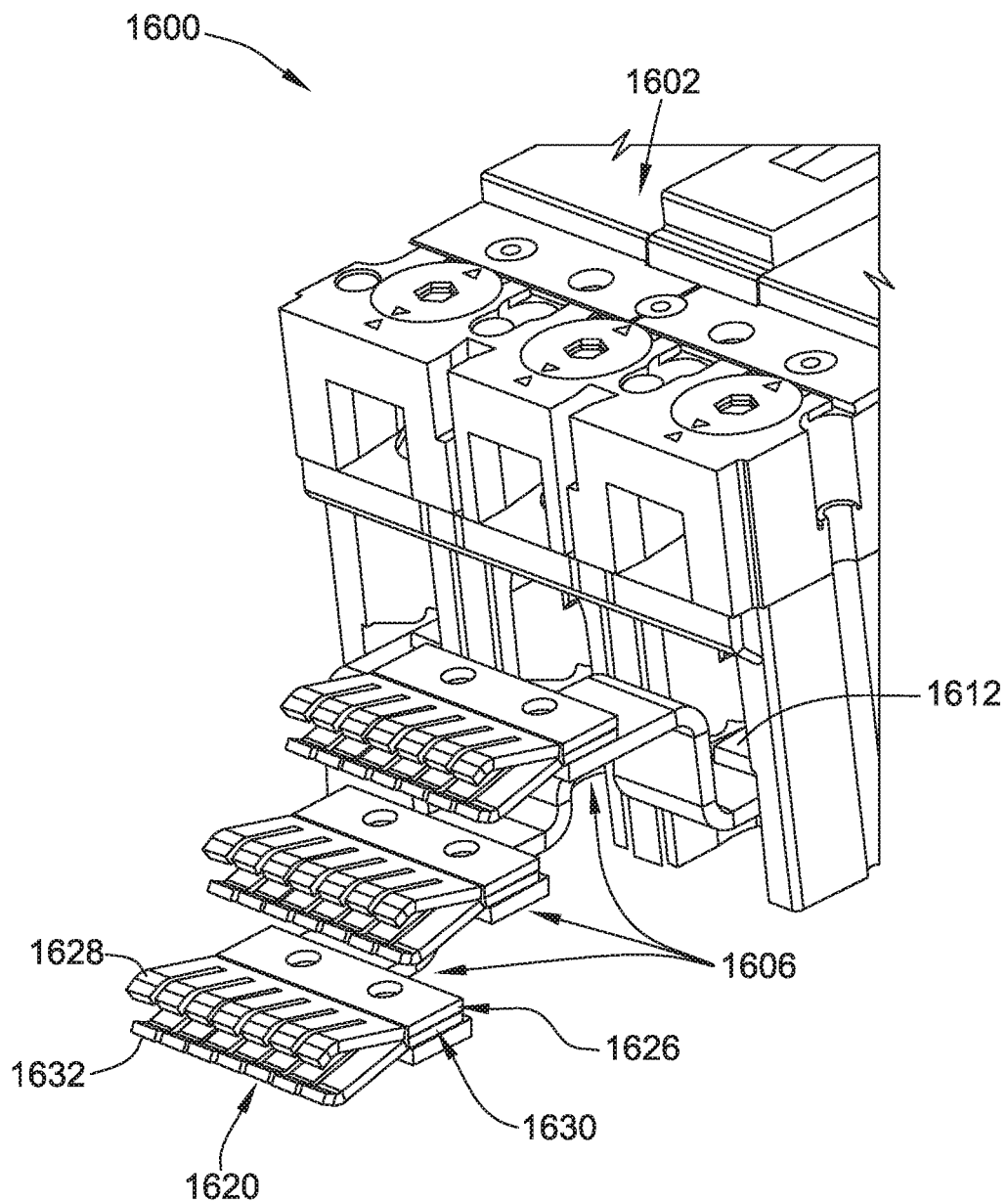
FIG. 18 is a partial view of the electrical device shown in FIG. 16 with certain components omitted to illustrate underlying features.
Figure 19:
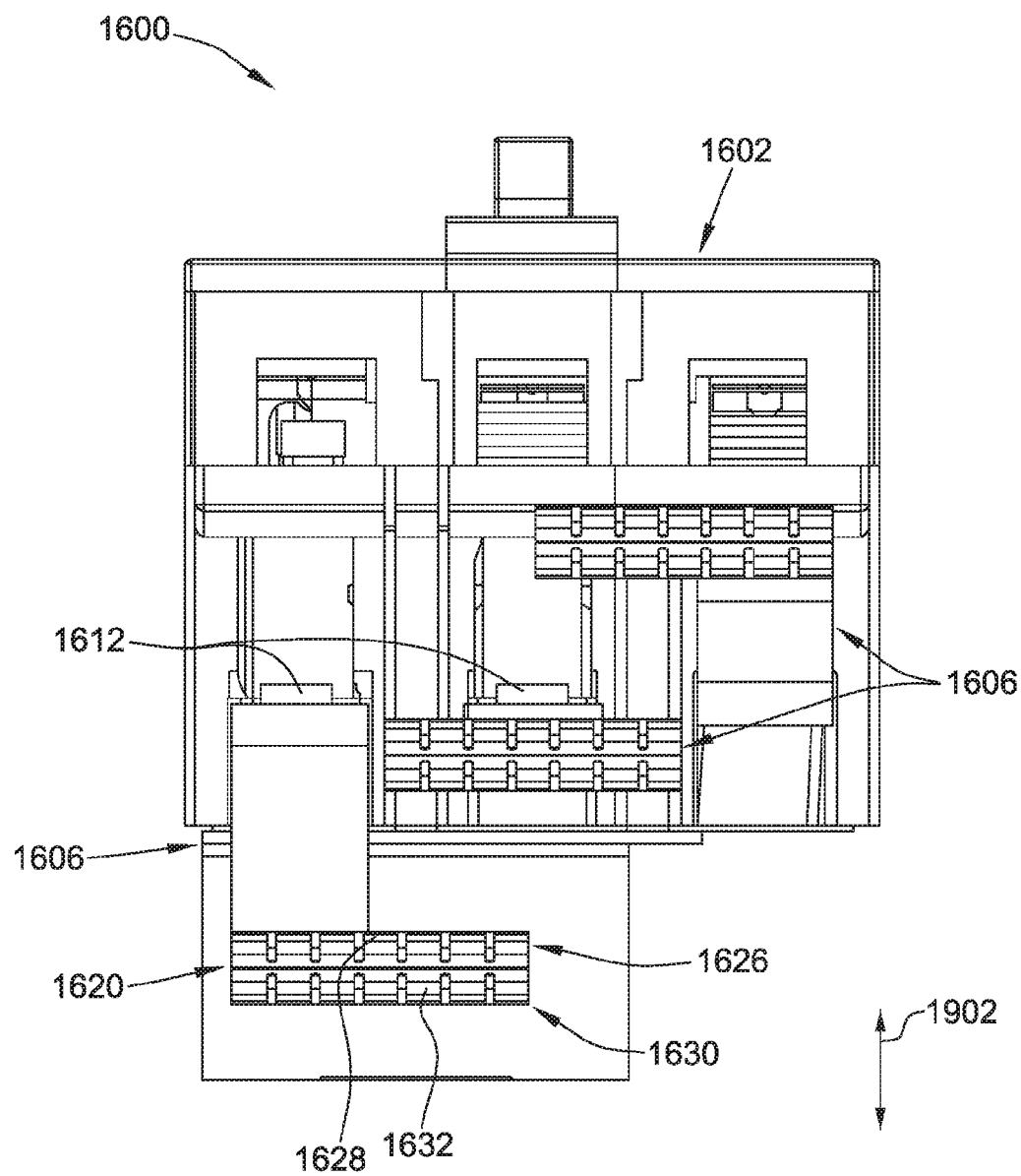
FIG. 19 is an end view of the electrical device as shown in FIG. 18.

FIG. 18 is a partial view of electrical device 1600 shown in FIG. 16 with certain components omitted to illustrate underlying features. FIG. 19 is an end view of electrical device 1600 shown in FIG. 18. As shown in FIGS. 18 and 19, when electrical device 1600 is assembled, each electrical connector 1606 is connected to one of line terminals 1612 of breaker unit 1602. Moreover, as shown in FIG. 19, each connector clip 1620 is spaced from each adjacent connector clip 1620 in a first direction, indicated by arrow 1902. The center-to-center spacing between adjacent pairs of connector clips 1620 is substantially equal to center-to-center spacing 220 between connector channels 218 of adjacent bus bars 202 of bus bar assembly 108 (FIG. 2).

Figure 20:
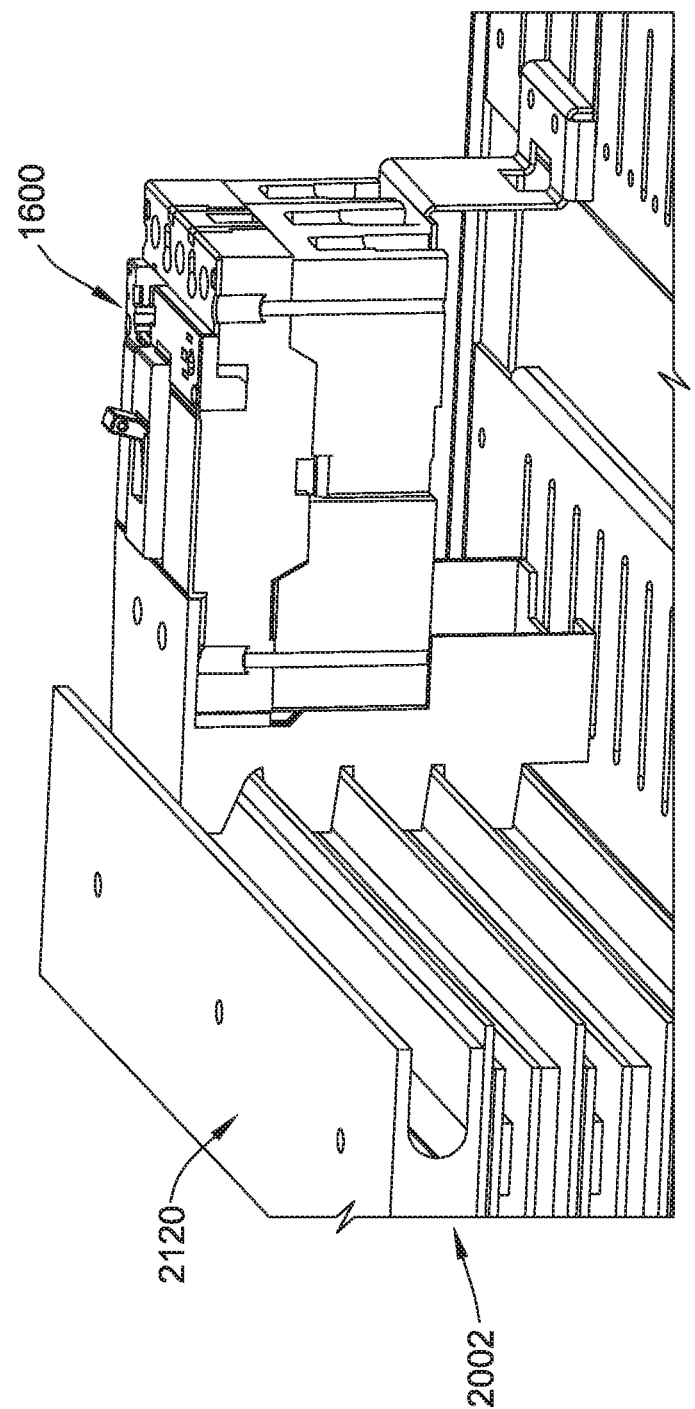
FIG. 20 is a perspective view of the electrical device shown in FIGS. 16-19 connected to a stacked bus bar assembly.
Figure 21:
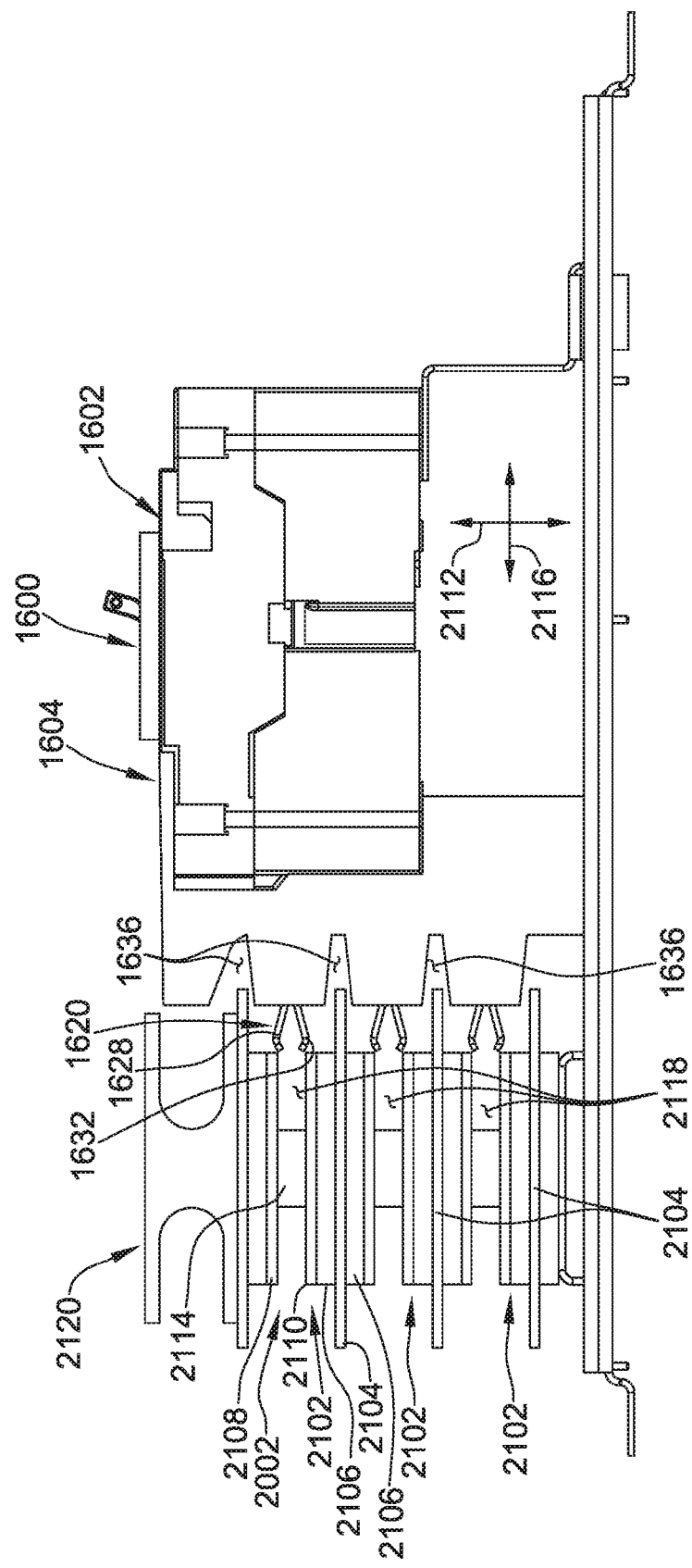
FIG. 21 is a side view of the electrical device shown in FIG. 20 prior to being connected to the bus bar assembly shown in FIG. 20.
Figure 22:
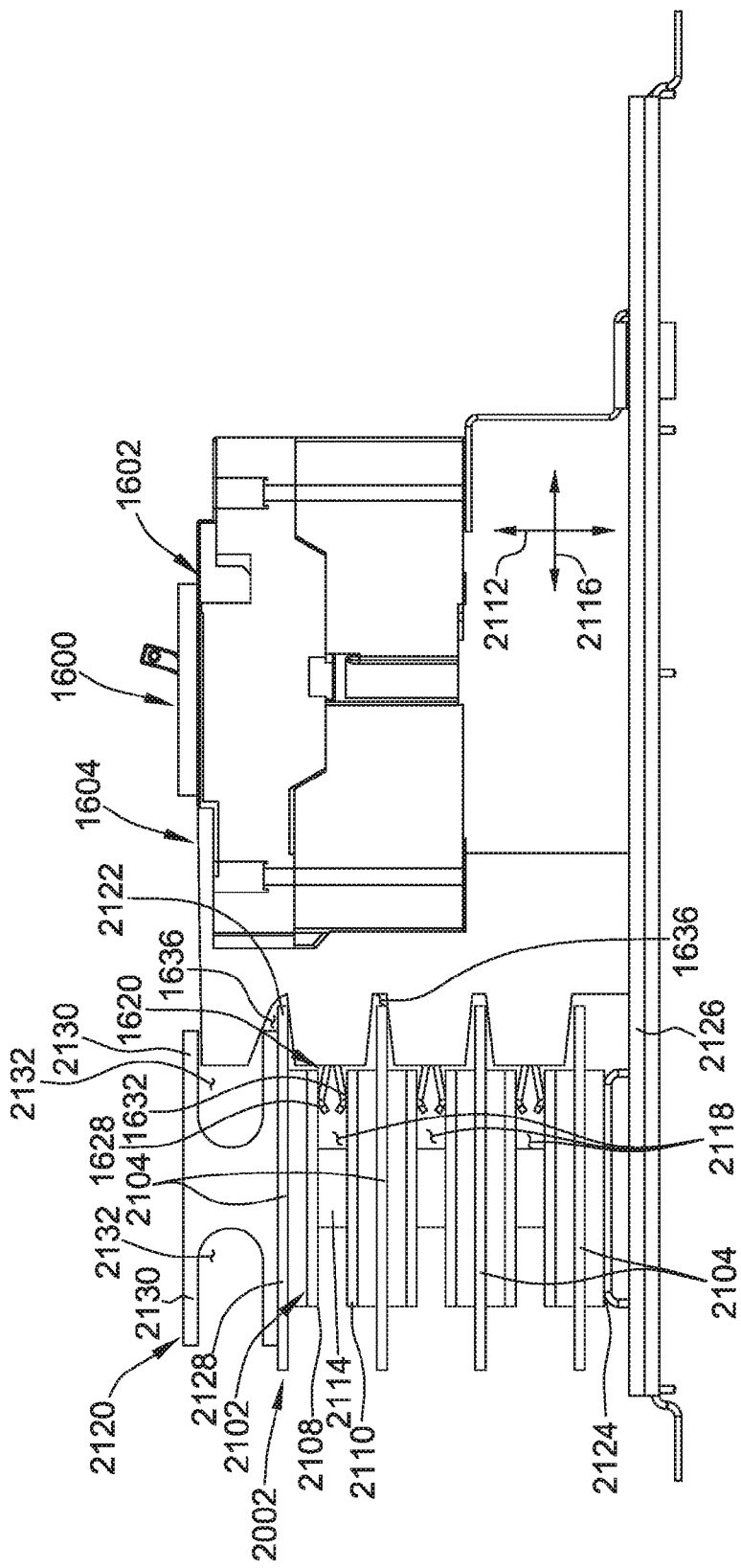
FIG. 22 is a side view of the electrical device shown in FIG. 21 connected to the bus bar assembly shown in FIG. 21.

FIG. 20 is a perspective view of electrical device 1600 shown in FIGS. 16-19 connected to a stacked bus bar assembly 2002. FIG. 21 is a side view of electrical device 1600 shown in FIG. 20 prior to being connected to bus bar assembly 2002. FIG. 22 is a side view of electrical device 1600 connected to bus bar assembly 2002.

Referring to FIGS. 21 and 22, bus bar assembly 2002 is substantially identical to bus bar assembly 108 described above with reference to FIGS. 1-2. Specifically, bus bar assembly 2002 includes three modular bus bars 2102 arranged in a stacked configuration. Each bus bar 2102 is spaced from adjacent bus bars 2102 by one bus bar insulator 2104 disposed between two spacers 2106. Each bus bar 2102 includes a first plate 2108, a second plate 2110 spaced from first plate 2108 in a vertical direction, indicated by arrow 2112, and an intermediate member 2114 disposed between and interconnecting first plate 2108 and second plate 2110. In the embodiment illustrated in FIGS. 20-22, each of first plate 2108, second plate 2110, and intermediate member 2114 is constructed from an electrically conductive material.

As shown in FIGS. 21 and 22, as electrical device 1600 is moved towards bus bar assembly 2002 in a transverse direction, indicated by arrow 2116, bus bar insulators 2104 are received within grooves 1636 of bus side insulating member 1604 before connector clips 1620 engage bus bars 2102. Thus, bus side insulating member 1604 cooperatively engages bus bar assembly 2002 (specifically, bus bar insulators 2104) to isolate adjacent bus bars 2102 from one another and adjacent connector clips 1620 from one another, and provides arc mitigation in the event electrical device 1600 is connected or disconnected to bus bar assembly 2002 while under an active power supply.

As shown in FIG. 21, before electrical device 1600 is coupled to bus bar assembly 2002, connector clips 1620 are in a relaxed, or uncompressed position. First contact segment 1628 and second contact segment 1632 are depressible from their respective relaxed positions to a depressed or compressed position, shown in FIG. 22. Connector clips 1620 are constructed such that first contact segment 1628 and second contact segment 1632 are biased towards their respective relaxed positions. As a result, when electrical device 1600 is coupled to bus bar assembly 2002 and connector clips 1620 are inserted into connector channels 2118, first contact segment 1628 and second contact segment 1632 are biased against one of first plate 2108 or second plate 2110. The biasing force of connector clips 1620 thus facilitates maintaining electrical contact between connector clips 1620 and bus bar assembly 2002.

In some embodiments, the electrical distribution apparatus described herein include a support structure or brace configured to maintain the structural integrity of the bus bar assembly and inhibit expansion and/or contraction of the bus bar assembly (e.g., during a short circuit event). Referring to FIGS. 20-22, for example, a support brace 2120 is coupled to a first side 2122 (FIG. 22) of bus bar assembly 2002, generally opposite a second side 2124 (FIG. 22) of bus bar assembly 2002 that is mounted to a frame 2126. In use, bus bar assembly 2002 may be subjected to contractive and/or expansive forces in vertical direction 2112 during a short circuit event. The contractive and expansive forces may be the result of electromagnetic interaction between various components of bus bar assembly 2002 and/or mechanical forces imparted on bus bar assembly 2002 from electrical device 1600 (e.g., resulting from operation of an internal trip mechanism within electrical device 1600). Support brace 2120 is configured to inhibit expansion and/or contraction of bus bar assembly 2002 in vertical direction 2112, for example, during a short circuit event.

As shown in FIG. 22, in the exemplary embodiment, support brace 2120 is coupled to an uppermost bus bar insulator 2128 of bus bar assembly 2002, and extends a length in a longitudinal direction orthogonal to vertical direction 2112 and transverse direction 2116 substantially equal to a length of bus bar assembly 2002. In other embodiments, support brace 2120 may extend a length in the longitudinal direction greater than or less than the length of bus bar assembly 2002. In yet other embodiments, a second support brace (not shown in FIG. 22) may be coupled to second side 2124 of bus bar assembly 2002. In some embodiments, support brace 2120 is coupled to frame 2126 by vertically extending brackets (not shown in FIG. 22) along one or both longitudinal ends of support brace 2120.

Support brace 2120 is constructed from a suitably rigid material so as to inhibit expansion and contraction of bus bar assembly 2002 in vertical direction 2112. Suitable materials from which support brace 2120 may be constructed include, for example and without limitation, thermoplastics and thermosets.

In the exemplary embodiment, support brace 2120 includes tubular members 2130 disposed on laterally opposite sides of support brace 2120. Each tubular member 2130 has a generally U-shaped cross-section defining an exhaust channel 2132 coupled in fluid communication with exhaust ports 1638 (shown in FIGS. 16 and 17) defined by bus side insulating member 1604. Exhaust channels 2132 extend a length in the longitudinal direction substantially equal to the length of stacked bus bar assembly 2002. Exhaust channels 2132 are configured to direct pressurized gas and other airborne particles generated by breaker unit 1602 of electrical device 1600 (e.g., during a trip or short circuit event) out of breaker unit 1602 and towards one or both of longitudinal ends of stacked bus bar assembly 2002, thereby reducing the potential for additional electrical faults. Exhaust channels 2132 may be coupled in fluid communication with a designated exhaust chamber or port of an enclosure, such as enclosure 700, in which stacked bus bar assembly 2002 is mounted. In other embodiments, tubular members 2130 defining exhaust channels 2132 may have cross-sections other than a U-shaped cross-section and, generally, may have any suitable cross-sectional shape that enables the exhaust channels to function as described herein.

Figure 23:
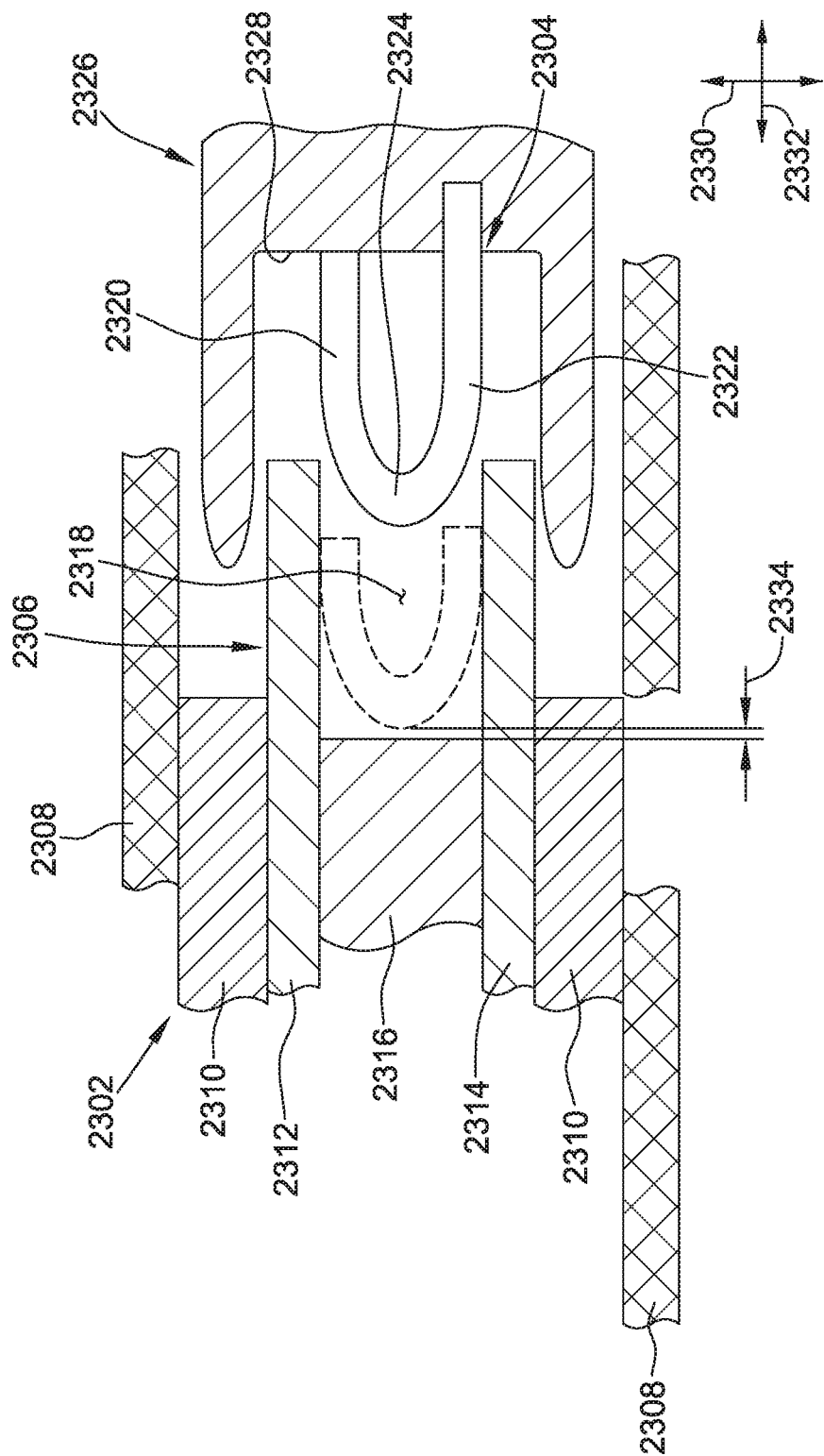
FIG. 23 is a partial schematic view of another embodiment of a stacked bus bar assembly and a connector clip suitable for use with the bus bar assembly.

FIG. 23 is a partial schematic view of another embodiment of a bus bar assembly 2302 and a connector clip 2304 suitable for use with bus bar assembly 2302. Bus bar assembly 2302 is substantially identical to bus bar assembly 108 described above with reference to FIGS. 1-2. Specifically, bus bar assembly 2302 includes a modular bus bar 2306 separated from adjacent bus bars (not shown in FIG. 23) of bus bar assembly 2302 by bus bar insulators 2308 and spacers 2310. Portions of the bus bar insulators 2308 are not shown in FIG. 23.

Bus bar 2306 includes a first plate 2312, a second plate 2314 spaced from first plate 2312 in a vertical direction, indicated by arrow 2330, and an intermediate member 2316 disposed between and interconnecting first plate 2312 and second plate 2314. In the embodiment illustrated in FIG. 23, each of first plate 2312, second plate 2314, and intermediate member 2316 is constructed from electrically conductive materials.

First plate 2312, second plate 2314, and intermediate member 2316 collectively define a connector channel 2318 sized and shaped to receive connector clip 2304 therein. In the exemplary embodiment, connector clip 2304 is a C-shaped connector clip, including a first contact segment 2320, a second contact segment 2322, and a C-shaped biasing element 2324 interconnecting first contact segment 2320 and second contact segment 2322. Biasing element 2324 biases first contact segment 2320 and second contact segment 2322 towards a relaxed position (shown in FIG. 23).

When connector clip 2304 is inserted into connector channel 2318, first contact segment 2320 engages first plate 2312 and second contact segment 2322 engages second plate 2314. Moreover, first contact segment 2320 and second contact segment 2322 are compressed from a relaxed position (shown in FIG. 23) to a compressed or depressed position (shown in broken lines in FIG. 23), and biasing element 2324 biases first contact segment 2320 against first plate 2312 and second contact segment 2322 against second plate 2314.

Connector clip 2304 is part of an electrical device (not shown) that includes a plurality of connector clips (only one shown in FIG. 23) and a bus side insulating member 2326 providing electrical insulation between connector clips 2304. As shown in FIG. 23, bus side insulating member 2326 includes a recessed surface 2328 that engages bus bar 2306 when connector clip 2304 is inserted into connector channel 2318. Specifically, recessed surface 2328 engages first plate 2312 and second plate 2314 when connector clip 2304 is inserted into connector channel 2318 to limit an insertion depth of connector clip 2304. The position of connector clip 2304 when inserted into connector channel 2318 is shown in broken lines in FIG. 23. As shown in FIG. 23, when connector clip 2304 is inserted into connector channel 2318, connector clip 2304 is spaced from intermediate member 2316 of bus bar 2306 in a transverse direction, indicated by arrow 2332, by a gap 2334 due to engagement between recessed surface 2328 of bus side insulating member 2326 and first and second plates 2312, 2314.

Figure 24:
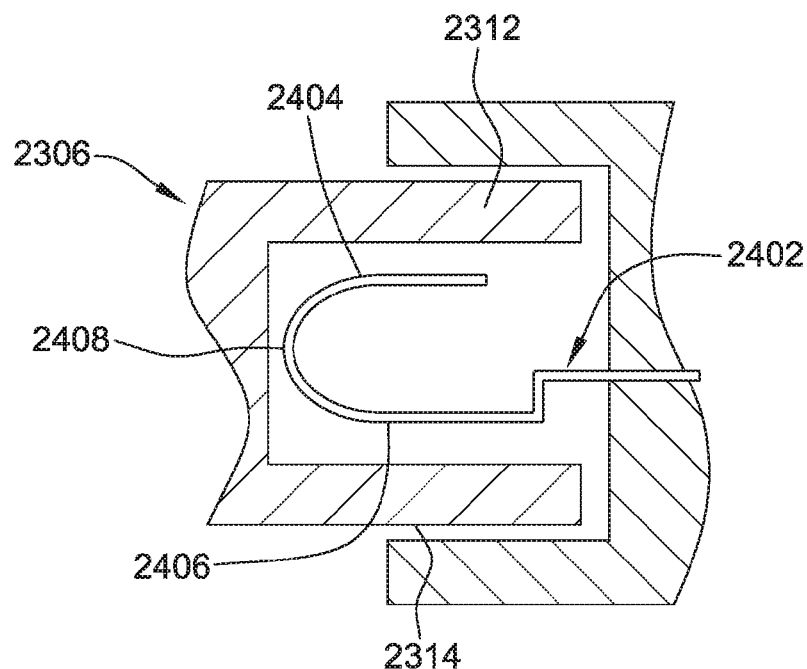
FIG. 24 is a partial schematic view of an alternative embodiment of a connector clip electrically coupled to a bus bar of the bus bar assembly shown in FIG. 23.

FIG. 24 is a partial schematic view of an alternative embodiment of a connector clip 2402 electrically coupled to bus bar 2306 of bus bar assembly 2302 shown in FIG. 23. Connector clip 2402 is a another embodiment of a C-shaped connector clip, including a first contact segment 2404, a second contact segment 2406, and a C-shaped biasing element 2408 interconnecting first contact segment 2404 and second contact segment 2406.

Figure 25:
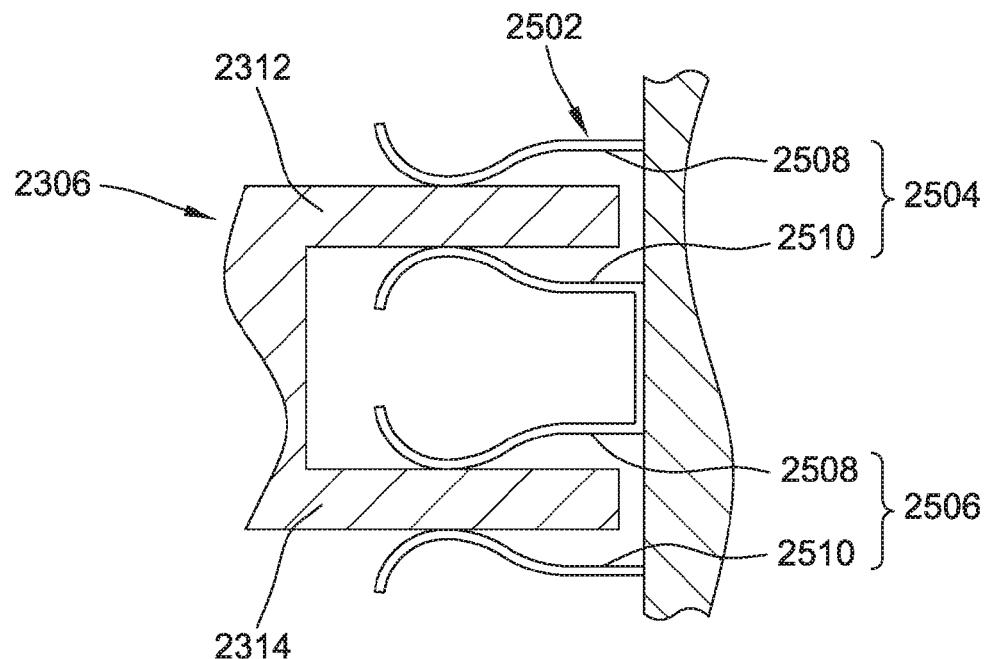
FIG. 25 is a partial schematic view of another alternative embodiment of a connector clip electrically coupled to a bus bar of the bus bar assembly shown in FIG. 23.

FIG. 25 is a partial schematic view of another alternative embodiment of a connector clip 2502 electrically coupled to bus bar 2306 of bus bar assembly 2302 shown in FIG. 23. Connector clip 2502 includes a first pair 2504 of contact members configured to engage first plate 2312, and a second pair 2506 of contact members configured to engage second plate 2314. Each pair 2504, 2506 of contact members includes a first contact member 2508 and a second contact member 2510. First contact member 2508 and second contact member 2510 are configured to engage one of first plate 2312 and second plate 2314 on opposite sides of the corresponding first plate 2312 or second plate 2314, as shown in FIG. 25.

Figure 26:
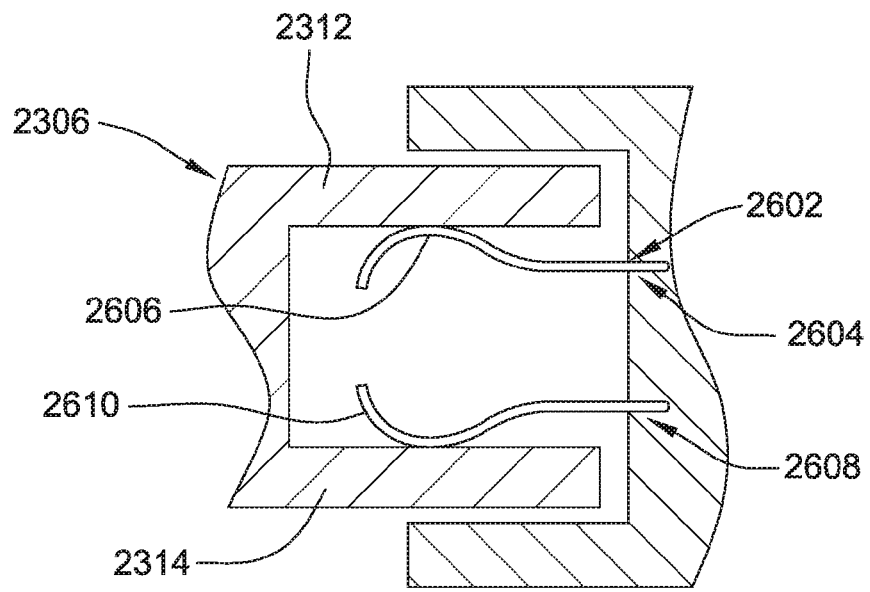
FIG. 26 is a partial schematic view of yet another alternative embodiment of a connector clip electrically coupled to a bus bar of the bus bar assembly shown in FIG. 23.

FIG. 26 is a partial schematic view of yet another alternative embodiment of a connector clip 2602 electrically coupled to bus bar 2306 of bus bar assembly 2302 shown in FIG. 23. Connector clip 2602 is another embodiment of a Y-shaped connector clip, including a first contact member 2604 having first contact segment 2606, and a second contact member 2608 having a second contact segment 2610. First contact segment 2606 engages first plate 2312, and second contact segment 2610 engages second plate 2314.

Figure 27:
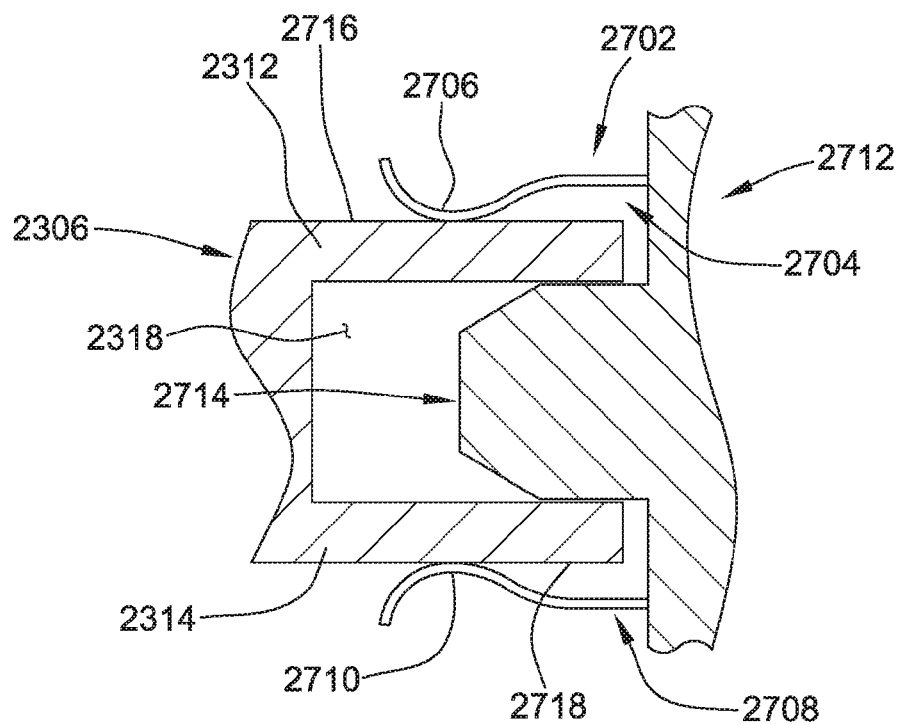
FIG. 27 is a partial schematic view of yet another alternative embodiment of a connector clip electrically coupled to a bus bar of the bus bar assembly shown in FIG. 23.

FIG. 27 is a partial schematic view of yet another alternative embodiment of a connector clip 2702 electrically coupled to bus bar 2306 of bus bar assembly 2302 shown in FIG. 23. Connector clip 2702 includes a first contact member 2704 having a first contact segment 2706, and a second contact member 2708 having a second contact segment 2710. Connector clip 2702 is part of an electrical device (not shown) that includes a plurality of connector clips (only one shown in FIG. 27) and a bus side insulating member 2712 providing electrical insulation between connector clips 2702. Moreover, bus side insulating member 2712 includes a protrusion 2714 disposed between first contact member 2704 and second contact member 2708. Protrusion 2714 is sized and shaped to be received within connector channel 2318 defined by bus bar 2306. In some embodiments, protrusion 2714 has a thickness slightly greater than a thickness of connector channel 2318 such that, when protrusion 2714 is inserted into connector channel 2318, protrusion 2714 engages first plate 2312 and second plate 2314 and deflects first plate 2312 and second plate 2314 away from one another.

In the embodiment illustrated in FIG. 27, when connector clip 2702 is electrically coupled to bus bar 2306, first contact member 2704 engages first plate 2312 along a first outer surface 2716 of bus bar 2306 defined by first plate 2312, and second contact member 2708 engages second plate 2314 along a second outer surface 2718 of bus bar 2306 defined by second plate 2314. Moreover, protrusion 2714 of bus side insulating member 2712 is received within connector channel 2318, and deflects first plate 2312 and second plate 2314 away from one another. Protrusion 2714 also biases first plate 2312 against first contact member 2704 and second plate 2314 against second contact member 2708 to facilitate maintaining electrical contact between bus bar 2306 and connector clip 2702.

Figure 37:
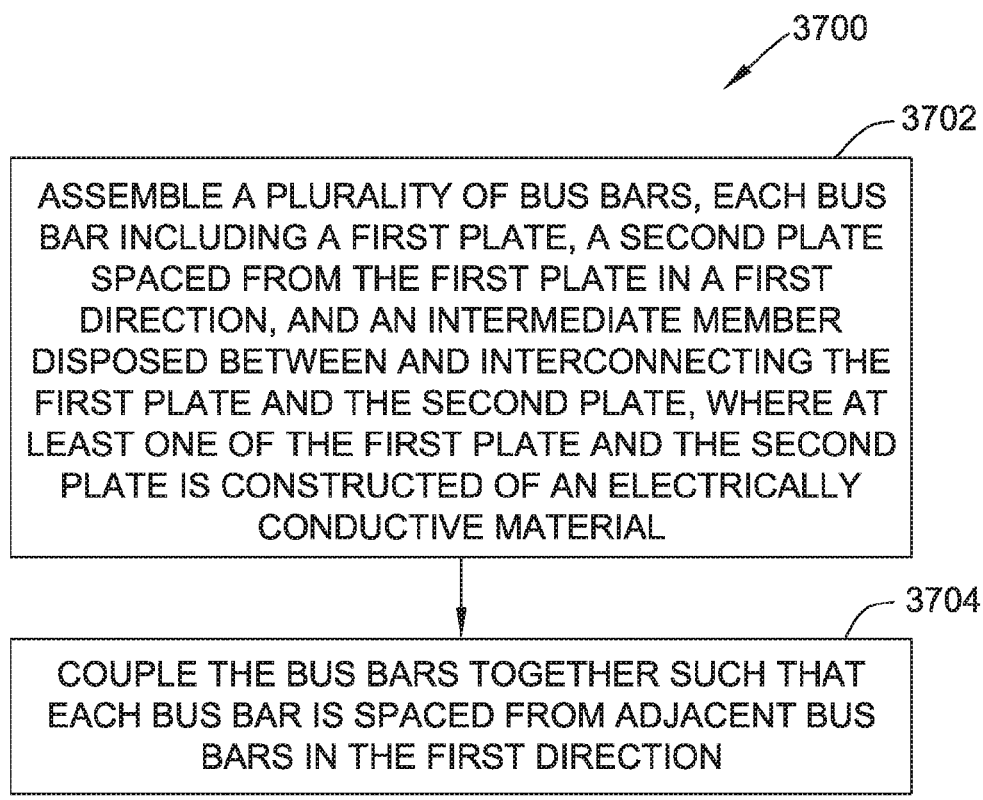
FIG. 37 is a flow chart of an exemplary method of assembling an electrical distribution apparatus.

FIG. 37 is a flow chart of an exemplary method 3700 of assembling an electrical distribution apparatus, such as electrical distribution apparatus 102 described above with reference to FIGS. 1 and 2. Although method 3700 is described with reference to electrical distribution apparatus 102 shown in FIGS. 1 and 2, method 3700 may be used to assemble electrical distribution apparatus other than electrical distribution apparatus 102.

Referring to FIGS. 1, 2, and 37, method 3700 includes assembling 3702 a plurality of bus bars, such as bus bars 202, and coupling 3704 the plurality of bus bars together such that each bus bar of the plurality bus bars is spaced from adjacent bus bars of the plurality of bus bars in a first direction, such as vertical direction 204. Each bus bar of the plurality of bus bars includes a first plate, such as first plate 210, a second plate, such as second plate 212, spaced from the first plate in the first direction, and an intermediate member, such as intermediate member 214, disposed between and interconnecting the first plate and the second plate. At least one of the first plate and the second plate is constructed of an electrically conductive material.

In some embodiments, assembling 3702 the plurality of bus bars includes, for each bus bar of the plurality of bus bars, coupling the first plate, the second plate, and the intermediate member together such that the second plate is spaced from the first plate in the first direction by the intermediate member, and the intermediate member is disposed between the first plate and the second plate. The first plate, second plate, and intermediate member may be coupled together using suitable fasteners including, for example and without limitation, bolts and screws. The fasteners may be constructed from an electrically insulative material or be otherwise electrically insulated to maintain electrical isolation between each bus bar of the plurality of bus bars.

Figure 38:
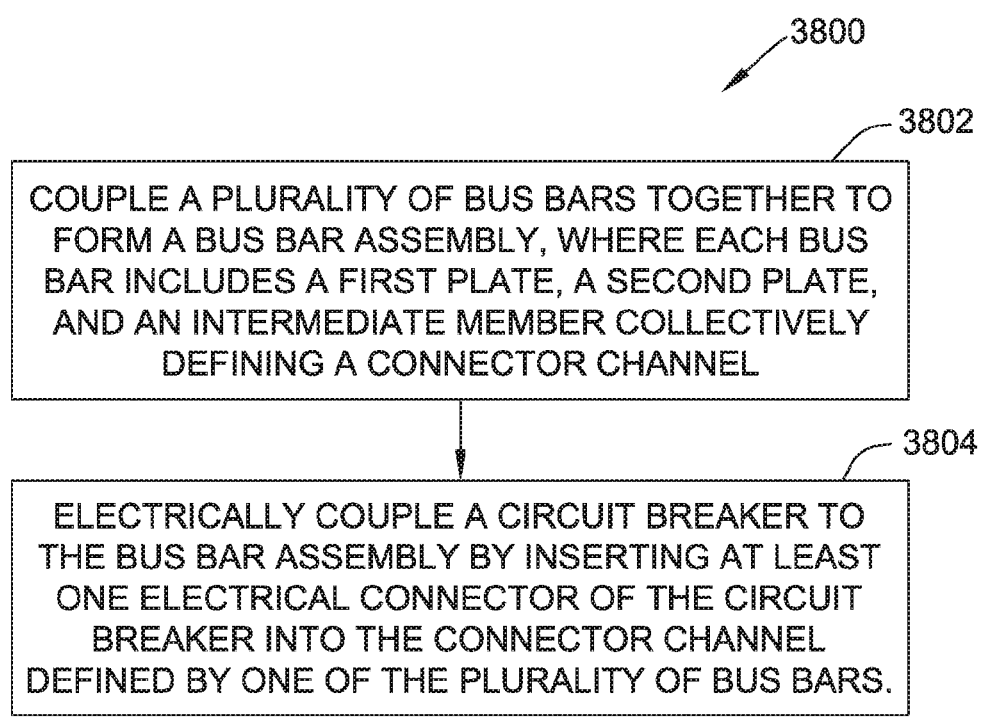
FIG. 38 is a flow chart of an exemplary method of assembling an electrical distribution system.

FIG. 38 is a flow chart of an exemplary method 3800 of assembling an electrical distribution system, such as electrical distribution system 100 shown and described above with reference to FIGS. 1 and 2. Although method 3800 is described with reference to electrical distribution system 100 shown in FIGS. 1 and 2, method 3800 may be used to assemble electrical distribution systems other than electrical distribution system 100.

Referring to FIGS. 1, 2, and 38, method 3800 includes coupling 3802 a plurality of bus bars together, such as bus bars 202, to form a bus bar assembly, such as bus bar assembly 108, where each bus bar of the plurality of bus bars includes a first plate, a second plate, and an intermediate member collectively defining a connector channel, and electrically coupling 3804 a circuit breaker to the bus bar assembly by inserting at least one electrical connector of the circuit breaker into the connector channel defined by one of the plurality of bus bars. In some embodiments, electrically coupling 3804 the circuit breaker to the bus bar assembly includes inserting a connector clip of the circuit breaker having a first contact segment and a second contact segment into the connector channel defined by one of the plurality of bus bars such that the first contact segment engages the first plate of the corresponding bus bar and the second contact segment engages the second plate of the corresponding bus bar.

Exemplary embodiments of electrical distribution apparatus and methods of assembling electrical distribution apparatus are described above in detail. The electrical distribution apparatus and methods are not limited to the specific embodiments described herein but, rather, components of the electrical distribution apparatus and/or operations of the methods may be utilized independently and separately from other components and/or operations described herein. Further, the described components and/or operations may also be defined in, or used in combination with, other systems, methods, and/or devices, and are not limited to practice with only the electrical distribution systems and apparatus described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical distribution apparatus comprising:
a stacked bus bar assembly comprising a plurality of bus bars, each bus bar of said plurality of bus bars electrically insulated from one another and comprising:
a first plate;
a second plate spaced from said first plate in a first direction; and
an intermediate member disposed between and interconnecting said first plate and said second plate, wherein one or both of said first plate and said second plate is constructed of an electrically conductive material, wherein said each bus bar defines a connector channel extending around the entirety of a perimeter of said each bus bar, the connector channel configured to receive an electrical connector of one or more electrical devices, wherein said intermediate member extends longitudinally between first and second lateral sides of said each bus bar such that the connector channel has a substantially uniform depth around the perimeter of said each bus bar;
wherein said stacked bus bar assembly includes a rear side adapted for mounting to a frame such that said connector channel is accessible from each of said first and second lateral sides of said each bus bar when mounted to the frame.

2. The electrical distribution apparatus in accordance with claim 1, wherein said first plate, said second plate, and said intermediate member of said each bus bar define the connector channel.

3. The electrical distribution apparatus in accordance with claim 2, wherein each of said first plate and said second plate has a length, a width, and a thickness, wherein each of said first plate and said second plate is interchangeable with a plate having one or more of a different thickness, a different length, and a different width without changing a thickness of the connector channel and a center-to-center spacing between adjacent ones of the connector channel.

4. The electrical distribution apparatus in accordance with claim 2, wherein one or both of said first plate and said second plate comprises a plurality of segments, wherein at least one segment of said plurality of segments is interchangeable with a plate segment having one or more of a different width, a different thickness, and a different conductivity than said at least one segment without changing a thickness of the connector channel and a center-to-center spacing between adjacent ones of the connector channel.

5. The electrical distribution apparatus in accordance with claim 1, wherein said each bus bar has an H-shaped cross-section.

6. The electrical distribution apparatus in accordance with claim 1, wherein each of said first plate and said second plate of said each bus bar is constructed of an electrically conductive material.

7. The electrical distribution apparatus in accordance with claim 1, wherein one of said first plate and said second plate of said each bus bar is constructed from an electrically conductive material, and another of said first plate and said second plate is constructed from an electrically insulative material.

8. The electrical distribution apparatus in accordance with claim 1, wherein said intermediate member of said each bus bar is constructed from an electrically insulative material.

9. The electrical distribution apparatus in accordance with claim 1, wherein said intermediate member of said each bus bar is constructed from an electrically conductive material.

10. The electrical distribution apparatus in accordance with claim 1, wherein each of said first plate and said second plate includes a flared end segment oriented at an oblique angle with respect to a plane in which the corresponding first plate or second plate is disposed.

11. The electrical distribution apparatus in accordance with claim 1, wherein said stacked bus bar assembly further includes a front side opposite said rear side, said electrical distribution apparatus further comprising a support brace coupled to one or more of said rear side and said front side, said support brace configured to inhibit at least one of expansion and contraction of said stacked bus bar assembly during a short circuit event.

12. The electrical distribution apparatus in accordance with claim 11, wherein said support brace defines an exhaust channel configured to direct exhaust gases towards a longitudinal end of said stacked bus bar assembly.

13. The electrical distribution apparatus in accordance with claim 1, further comprising a tubular member coupled to said stacked bus bar assembly, said tubular member defining an exhaust channel configured to direct exhaust gases towards a longitudinal end of said stacked bus bar assembly.

14. The electrical distribution apparatus in accordance with claim 1, wherein at least two of said first plate, said second plate, and said intermediate member of at least one bus bar of said plurality of bus bars are formed integrally with one another.

15. An electrical distribution system comprising:
a frame;
a stacked bus bar assembly coupled to said frame, said stacked bus bar assembly comprising a plurality of bus bars, each bus bar of said plurality of bus bars electrically insulated from one another, adjacent bus bars of said plurality of bus bars spaced from one another in a first direction, said each bus bar defining a connector channel extending around the entirety of a perimeter of said each bus bar, wherein the connector channel has a substantially uniform depth around the perimeter of said each bus bar; and
an electrical device electrically coupled to said stacked bus bar assembly, said electrical device comprising a plurality of connector clips, adjacent connector clips of said plurality of connector clips spaced from one another in the first direction, each connector clip of said plurality of connector clips disposed within the connector channel of a corresponding one of said plurality of bus bars;
wherein said stacked bus bar assembly is coupled to said frame such that said connector channel of said each bus bar is accessible from each of a first lateral side and a second lateral side of said each bus bar.

16. The electrical distribution system in accordance with claim 15, wherein said each bus bar comprises:
a first plate;
a second plate spaced from said first plate in the first direction; and
an intermediate member disposed between and interconnecting said first plate and said second plate, wherein said first plate, said second plate, and said intermediate member collectively define of the connector channel, wherein said each connector clip engages said first plate and said second plate.

17. The electrical distribution system in accordance with claim 15, wherein said stacked bus bar assembly includes a rear side coupled to said frame, and a front side opposite said rear side, said electrical distribution system further comprising a support brace coupled to at least one of said rear side and said front side, said support brace configured to inhibit at least one of expansion and contraction of said stacked bus bar assembly during a short circuit event.

18. The electrical distribution system in accordance with claim 15, wherein said frame comprises a modular frame assembly including a central frame section having a mounting surface disposed between lateral sides of said central frame section, said stacked bus bar assembly mounted on said mounting surface.

19. The electrical distribution system in accordance with claim 18, wherein said central frame section includes a coupling tab disposed along each of said lateral sides of said central frame section, each of said coupling tabs configured to be coupled to any one of a plurality of extension members to modify a width of said frame.

20. The electrical distribution system in accordance with claim 19, wherein said frame further comprises at least one of the extension members coupled to one of said coupling tabs of said central frame section.

21. A method of assembling an electrical distribution system, said method comprising:
providing a plurality of first plates, a plurality of second plates, and a plurality of intermediate members;
assembling a plurality of bus bars, wherein for each bus bar of the plurality of bus bars, assembling the bus bar includes coupling one first plate of the plurality of first plates, one second plate of the plurality of the second plates, and one intermediate member of the plurality of the intermediate members together such that the second plate is spaced from the first plate in a first direction by the intermediate member, the intermediate member extends longitudinally between first and second lateral sides of the each bus bar, and such that the first plate, the second plate, and the intermediate member define a connector channel that extends around at least a portion of a perimeter of the each bus bar and longitudinally along the first and second lateral sides of the each bus bar, wherein the connector channel has a substantially uniform depth along at least the first and second lateral sides of the each bus bar, wherein one or both of the first plate and the second plate is constructed of electrically conductive material;

coupling the plurality of bus bars together to form a stacked bus bar assembly, wherein the plurality of bus bars is coupled together such that the each bus bar is electrically insulated from each other bus bar of the plurality of bus bars, adjacent bus bars of the plurality of bus bars are spaced from one another in the first direction by a bus bar insulator and one or more spacers between the adjacent bus bars, and at least one of the first plate or the second plate of the each bus bar, the bus bar insulator and one of the one or more spacers define a secondary channel sized and shaped to receive a portion of an electrical device therein, the secondary channel extends around the at least the portion of the perimeter of the each bus bar and longitudinally along the first and second lateral sides of the each bus bar, wherein the secondary channel has a substantially uniform depth along the at least the first and second lateral sides of the each bus bar; and coupling a rear side of the stacked bus bar assembly to a frame such that the connector channel of the each bus bar is accessible from each of the first and second lateral sides of the each bus bar.

22. The method in accordance with claim 21, wherein the electrical device is a circuit breaker, the method further comprising electrically coupling the circuit breaker to the bus bar assembly by inserting at least one electrical connector of the circuit breaker into the connector channel defined by one bus bar of the plurality of bus bars.

23. The method in accordance with claim 21, wherein the stacked bus bar assembly includes a front side opposite the rear side, said method further comprising:

coupling a support brace to one or more of the rear side and the front side, the support brace configured to inhibit at least one of expansion and contraction of the stacked bus bar assembly during a short circuit event.

* * * * *